(12) United States Patent
Takahashi et al.

(10) Patent No.: US 9,491,000 B2
(45) Date of Patent: Nov. 8, 2016

(54) DATA TRANSPORT SYSTEM, TRANSMISSION METHOD, AND TRANSPORT APPARATUS

(71) Applicant: Hitachi, Ltd., Tokyo (JP)

(72) Inventors: Kiyotaka Takahashi, Tokyo (JP); Yoshihiro Ashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 36 days.

(21) Appl. No.: 14/323,255

(22) Filed: Jul. 3, 2014

(65) Prior Publication Data
US 2015/0010009 A1 Jan. 8, 2015

(30) Foreign Application Priority Data

Jul. 8, 2013 (JP) ................................. 2013-142445

(51) Int. Cl.
| | |
|---|---|
| H04L 12/46 | (2006.01) |
| H04L 12/751 | (2013.01) |
| H04L 12/713 | (2013.01) |
| H04L 12/723 | (2013.01) |
| H04L 12/24 | (2006.01) |

(52) U.S. Cl.
CPC ....... *H04L 12/4633* (2013.01); *H04L 41/0879* (2013.01); *H04L 45/10* (2013.01); *H04L 45/50* (2013.01); *H04L 45/586* (2013.01)

(58) Field of Classification Search
CPC .............. H04L 12/4633; H04L 45/10; H04L 41/0879; H04L 45/50; H04L 45/586
See application file for complete search history.

(56) References Cited

U.S. PATENT DOCUMENTS

| | | | | |
|---|---|---|---|---|
| 2007/0104194 A1* | 5/2007 | Wijnands | .............. | H04L 12/185 370/390 |
| 2009/0201819 A1* | 8/2009 | Mizutani | ............... | H04L 12/185 370/241.1 |
| 2010/0271955 A1* | 10/2010 | Atsumi | ............... | H04L 12/5693 370/241 |
| 2012/0147893 A1* | 6/2012 | Shabtay | ............ | H04L 12/40189 370/395.53 |
| 2012/0163384 A1* | 6/2012 | Takase | .................... | H04L 45/36 370/392 |
| 2012/0250695 A1* | 10/2012 | Jia | .......................... | H04L 12/42 370/400 |

(Continued)

FOREIGN PATENT DOCUMENTS

JP 2013-026829 A 2/2013

*Primary Examiner* — Jae Y Lee
(74) *Attorney, Agent, or Firm* — Volpe and Koenig, P.C.

(57) ABSTRACT

A data transport system comprises transport apparatus and at least one computer. The transport apparatus construct a second network coupled to a first network which is constructed by a communication apparatus. A logical path is built between a first transport apparatus and the computer. The first transport apparatus is configured to: hold management information, which associates identification information of a port with logical path identification information; refer to the management information to identify the logical path identification information that is associated with the port through which the control information has been received; and assign the identified logical path identification information to the control information, and transmit the control information over the logical path. The computer assigns the logical path identification information assigned to the control information to response information, and transmits the response information to the second network.

14 Claims, 17 Drawing Sheets

(56) References Cited

U.S. PATENT DOCUMENTS

| | | | |
|---|---|---|---|
| 2013/0022052 A1* | 1/2013 | Takase | H04L 45/02 370/409 |
| 2013/0071116 A1* | 3/2013 | Ong | H04L 45/586 398/45 |
| 2013/0121164 A1* | 5/2013 | Shabtay | H04L 12/4641 370/241.1 |
| 2013/0194914 A1* | 8/2013 | Agarwal | H04L 45/245 370/225 |
| 2013/0208599 A1* | 8/2013 | Mashimo | H04L 45/125 370/238 |
| 2013/0272141 A1* | 10/2013 | Mashimo | H04L 43/18 370/248 |
| 2013/0315251 A1* | 11/2013 | Takahashi | H04L 69/324 370/394 |
| 2014/0185607 A1* | 7/2014 | Mashimo | H04L 45/10 370/351 |
| 2014/0293798 A1* | 10/2014 | Kang | H04L 43/0811 370/241.1 |

* cited by examiner

ID MANAGEMENT TABLE
| APPARATUS ID | IF ID | PHYSICAL PORT ID | ROUTER-SIDE ID | INTRA-MPLS-TP NETWORK ID |
|---|---|---|---|---|
| 100A | 120A | NP1 | 10 | 110 |
| 100A | 120B | NP3 | NULL | 100 |
*Fig. 3*
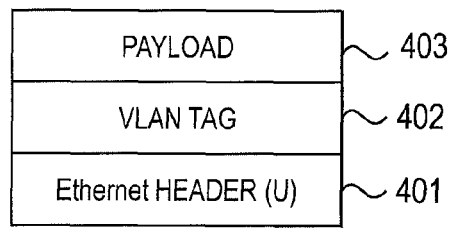
*Fig. 4*
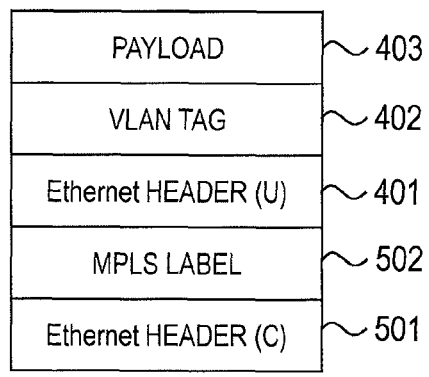
*Fig. 5*

ROUTER ADDRESS MANAGEMENT TABLE

| ROUTER ADDRESS (801) | INTRA-MPLS-TP NETWORK ID (802) |
|---|---|
| AAA | 110 |
| BBB | 100 |

*Fig. 8*

ID MANAGEMENT TABLE

| APPARATUS ID 301 | IF ID 302 | PHYSICAL PORT ID 303 | ROUTER-SIDE ID 304 | INTRA-MPLS-TP NETWORK ID 305 | REDUNDANCY INFORMATION 1301 |
|---|---|---|---|---|---|
| 100A | 120A | NP1 | 10 | 110 | ACTIVE PATH |
|  |  |  |  | 111 | STANDBY PATH |
| 100A | 120B | NP3 | NULL | 100 | STANDBY PATH |
|  |  |  |  | 101 | STANDBY PATH |

*Fig. 13*

ROUTER ADDRESS MANAGEMENT TABLE

| ROUTER ADDRESS (801) | INTRA-MPLS-TP NETWORK ID (802) | REDUNDANCY INFORMATION (1501) |
|---|---|---|
| AAA | 110 | ACTIVE PATH |
| | 111 | STANDBY PATH |
| BBB | 100 | ACTIVE PATH |
| | 101 | STANDBY PATH |

*Fig. 15*

ID MANAGEMENT TABLE

| APPARATUS ID | IF ID | PHYSICAL PORT ID | ROUTER-SIDE ID | PROTOCOL TYPE | INTRA-MPLS-TP NETWORK ID |
|---|---|---|---|---|---|
| 100A | 120A | NP1 | 10 | OSPF | 110 |
|  |  |  |  | LDP | 111 |
| 100A | 120B | NP3 | NULL | OSPF | 100 |
|  |  |  |  | LDP | 101 |

*Fig. 18*

ID MANAGEMENT TABLE

| APPARATUS ID | IF ID | PHYSICAL PORT ID | ROUTER-SIDE ID | INTRA-MPLS-TP NETWORK ID | SERVER REDUNDANCY INFORMATION |
|---|---|---|---|---|---|
| 100A | 120A | NP1 | 10 | 110 | ACTIVE SERVER |
|  |  |  |  | 111 | STANDBY SERVER |
| 100A | 120B | NP3 | NULL | 100 | ACTIVE SERVER |
|  |  |  |  | 101 | STANDBY SERVER |

*Fig. 19*

ROUTER ADDRESS MANAGEMENT TABLE

| ROUTER ADDRESS (801) | INTRA-MPLS-TP NETWORK ID (802) | SERVER REDUNDANCY INFORMATION (2001) |
|---|---|---|
| AAA | 110 | ACTIVE SERVER |

| | |
|---|---|
| PAYLOAD | 403 |
| IP | 4031 |
| VLAN TAG | 402 |
| Ethernet HEADER (U) | 401 |

*Fig. 21*

| | |
|---|---|
| PAYLOAD | 403 |
| IP | 4031 |
| VLAN TAG | 402 |
| Ethernet HEADER (U) | 401 |
| GRE | 2103 |
| IP | 2102 |
| Ethernet HEADER | 2101 |
| MPLS LABEL | 502 |
| Ethernet HEADER (C) | 501 |

*Fig. 22*

DATA TRANSPORT SYSTEM, TRANSMISSION METHOD, AND TRANSPORT APPARATUS

CLAIM OF PRIORITY

The present application claims priority from Japanese patent application JP 2013-142445 filed on Jul. 8, 2013, the content of which is hereby incorporated by reference into this application.

BACKGROUND OF THE INVENTION

This invention relates to a transport system in which a first network is coupled to a second network including transport apparatus.

In recent years, users' demands for a guaranteed bandwidth service in which the quality of communication is guaranteed are increasing. The guaranteed bandwidth service is a communication service that guarantees a bandwidth set out in an agreement with the user.

Internet Protocol/Multi-Protocol Label Switching (IP/MPLS) networks are wide-spread as a backbone network for providing the guaranteed bandwidth service to users. A packet is transferred in an IP/MPLS network with the use of label switching, instead of the traditional IP routing. An end-to-end logical path (communication path) is built by distributed control from communication apparatus used to construct an IP/MPLS network so that a bandwidth is guaranteed for each section.

Telecommunication carriers that use a transport network to provide the guaranteed bandwidth service are increasing in number. Centralized control-type communication protocols, such as Multi-Protocol Label Switching-Transport Profile (MPLS-TP), are used as a communication protocol for building a transport network. Transport networks can provide a logical path that is superior in confidentiality to one in traditional IP/MPLS networks. Transport networks are also rich in Operation, Administration, and Maintenance (OAM) functions for monitoring a communication route for a failure and QoS functions for guaranteeing the quality of service.

These advantages of transport networks are taken into consideration in standardization by the Internet Engineering Task Force (IETF) and others, where an IP interworking technology is beginning to be explored, which attempts to sophisticate IP services by using a traditional IP/MPLS network as a network that is coupled to users' bases for the purpose of keeping the cost low, using a transport network as a core network, and coupling these networks to each other.

In order to accomplish this IP interworking, the transport network and the IP/MPLS network need to be coupled to each other by one of centralized control, which is a network control method used in transport networks, and distributed control, which is a network control method used in IP/MPLS networks. Centralized control is inferior to distributed control in that the load concentrates on the management server and in terms of flexibility in network designing, but allows one to grasp the overall state of the network, which gives centralized control superiority in optimum route setting and the ease of management such as switching routes in the event of a failure. Distributed control, on the other hand, is superior to centralized control in terms of flexibility in network designing and scalability because the respective apparatus operate in an autonomous manner, but does not allow each apparatus to grasp the overall state of the network, which makes it difficult to optimize route settings and to clarify the location of a failure and the impact of the failure. It is therefore concluded that, with the sophistication of IP services as the aim, IP interworking is accomplished desirably by centralized control.

The discussion next focuses on the logical path building method in transport networks and the logical path building method in IP/MPLS networks. A logical path in a transport network is built generally by an administrator by statically setting a route of the logical path and a guaranteed bandwidth. A logical path in an IP/MPLS network is built by node apparatus by dynamically setting a route based on parameters (the link cost, hop count, and the like) of the network. When the guaranteed bandwidth service is provided, a logical path in an IP/MPLS network is built by using a dynamic bandwidth reservation protocol such as Resource Reservation Protocol-Traffic Engineering (RSVP-TE).

In IP interworking, a method of causing the entire transport network to seem like one virtual router is known in which a virtual router control server gathers control information exchanged over the IP/MPLS network and executes processing that corresponds to the control information (see JP 2013-26829 A, for example).

SUMMARY OF THE INVENTION

JP 2013-26829 A does not disclose a concrete configuration for transferring control information between a transport apparatus used to construct a transport network and a virtual router control server.

When a transport network is to be virtually caused to seem like a single router (virtual router), physical ports of transport apparatus coupled to the IP/MPLS network and physical ports of a virtual router control server need to be associated with each other on a one-to-one basis in order to transmit/receive control information between the transport apparatus and the virtual router control server. However, one virtual router control server only has a limited number of physical ports and, in the case of a large-scale transport network, it is difficult to associate the many physical ports of transport apparatus coupled to the IP/MPLS network with physical ports of a virtual router control server.

A network may logically be multiplexed on a physical port of a virtual router control server. Logically multiplexing a network on a physical port of a virtual router control server requires assigning logical identification information (e.g., a virtual local area network (VLAN) ID) to a packet that is exchanged. This identification information needs to be set to routers used to construct the IP/MPLS network, which presents an obstacle to migration from an existing network. The identification information also needs to be unique throughout the entire system, which makes system management and operation laborious.

Transport apparatus refer to the identification information to transfer control information to the virtual router control server, and transfer response information which is transmitted by the virtual router control server in response to the control information. Therefore, if a communication apparatus transmits control information without assigning the identification information thereto, or if pieces of control information transmitted from different communication apparatus are assigned overlapping identification information, response information which is transmitted by the virtual router control server in response to the control information cannot be transferred in the transport network.

An object of this invention is therefore to provide a transport system capable of transmitting/receiving control information and response information between a transport apparatus and a virtual router control server without setting special settings to an existing IP/MPLS network (a first network) when IP interworking is accomplished.

According to an aspect of the present invention, there is provided a data transport system, comprising: transport apparatus, which are used to construct a second network coupled to a first network; and at least one computer, which is coupled to the transport apparatus in the second network, wherein, in order to cause the second network to seem like a single virtual communication apparatus to a communication apparatus used to construct the first network, the at least one computer is configured to execute processing that corresponds to control information of the first network transmitted from the communication apparatus, wherein the transport apparatus include a first transport apparatus, which is coupled to the communication apparatus used to construct the first network, and a logical path is built between the first transport apparatus and the at least one computer, wherein the first transport apparatus is configured to: have at least one port coupled to the communication apparatus; hold management information, which associates identification information of the port coupled to the communication apparatus with logical path identification information for identifying a logical path that is used to transmit, to the at least one computer, control information received via the port; refer to the management information to identify the logical path identification information that is associated with the port through which the control information has been received; and assign the identified logical path identification information to the control information, and transmit the control information over a logical path that is identified by the identified logical path identification information, wherein the at least one computer is configured to: execute processing that corresponds to the received control information; and assign the logical path identification information that has been assigned to the control information to response information that is a response to the control information, and transmit the response information to the second network, and wherein the transport apparatus include a second transport apparatus, which is coupled to the at least one computer, and the second transport apparatus is configured to receive the response information and then transmit the response information over a logical path that is identified by the logical path identification information assigned to the received response information. A brief description is now given of effects provided by the exemplary embodiment of this invention disclosed in this application. This invention enables to provide a transport system capable of transmitting/receiving control information and response information between a transport apparatus and a virtual router control server without setting special settings to an existing IP/MPLS network (a first network) when IP interworking is accomplished.

Other objects, configurations, and effects than those described above are revealed in the following description of an embodiment.

BRIEF DESCRIPTION OF THE DRAWINGS

The present invention can be appreciated by the description which follows in conjunction with the following figures, wherein:

FIG. 3 is an explanatory diagram of an ID management table according to the first embodiment of this invention;

FIG. 4 is an explanatory diagram of a format of data that is transmitted/received in IP/MPLS networks according to the first embodiment of this invention;

FIG. 5 is an explanatory diagram of a format of data that is transmitted/received in an MPLS/TP network according to the first embodiment of this invention;

FIG. 8 is an explanatory diagram of a router address management table according to a second embodiment of this invention;

FIG. 13 is an explanatory diagram of an ID management table according to the third embodiment of this invention;

FIG. 15 is an explanatory diagram of a router address management table according to a modification example of the third embodiment of this invention;

FIG. 18 is an explanatory diagram of an ID management table according to the fourth embodiment of this invention;

FIG. 19 is an explanatory diagram of an ID management table according to the fifth embodiment of this invention;

FIG. 20 is an explanatory diagram of a router address management table according to the modification example of the fifth embodiment of this invention;

FIG. 21 is an explanatory diagram of a format of data that is transmitted/received in IP/MPLS networks according to a sixth embodiment of this invention, and FIG. 22 is an explanatory diagram of a format of data that is transmitted/received in an MPLS-TP network according to the sixth embodiment of this invention.

DETAILED DESCRIPTION OF THE PREFERRED EMBODIMENTS

Embodiments of this invention are described below with reference to the drawings.

First Embodiment

Figure 1:
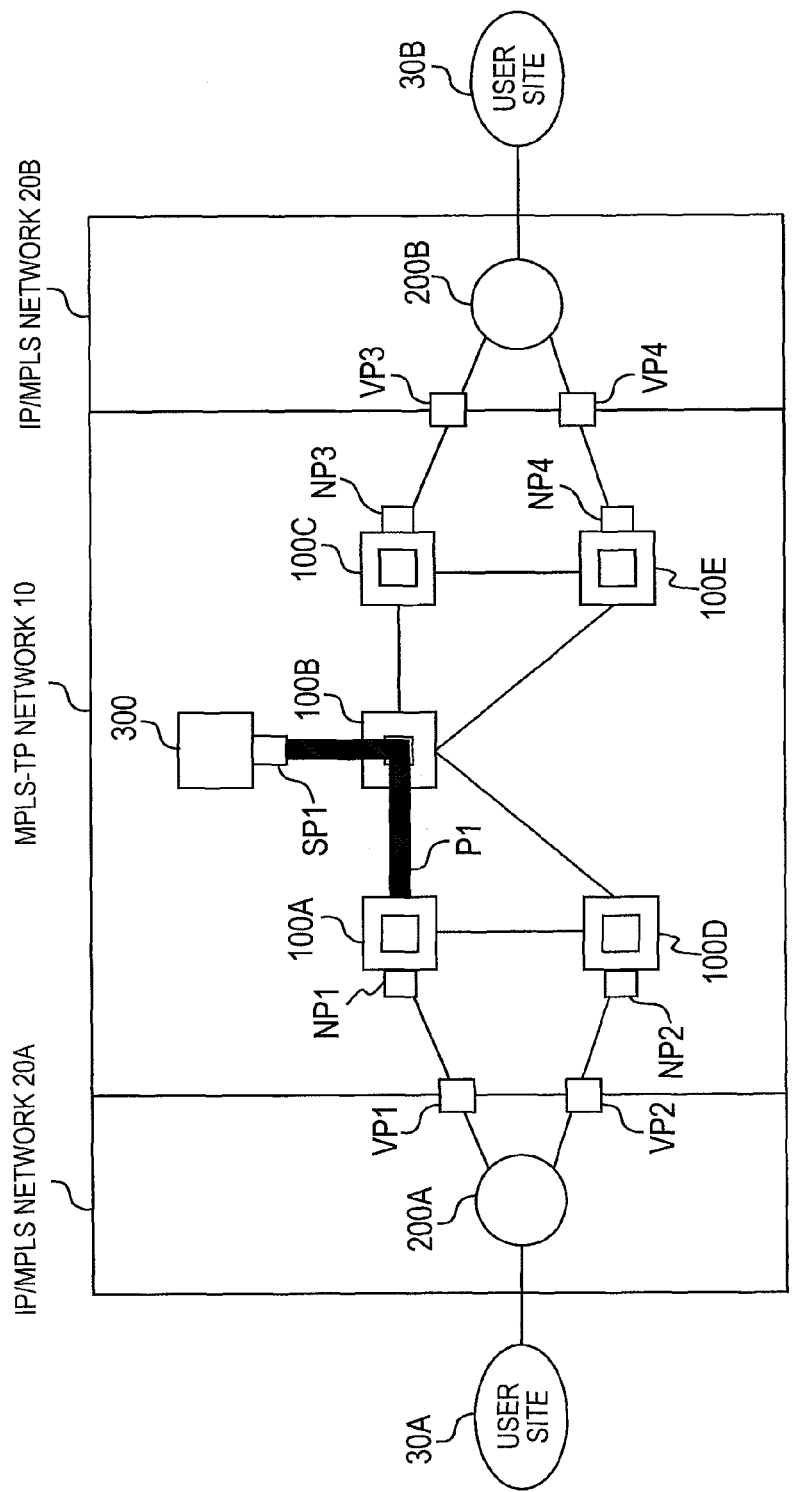
FIG. 1 is an explanatory diagram of a configuration of a transport system according to a first embodiment of this invention.

FIG. 1 is an explanatory diagram of the configuration of a transport system according to a first embodiment of this invention.

The transport system includes IP/MPLS networks (first networks) 20A and 20B which are constructed of IP/MPLS routers (communication apparatus) 200A and 200B, respectively, and an MPLS-TP network (a second network) 10 which is constructed of MPLS-TP apparatus (transport apparatus) 100A to 100E. The IP/MPLS routers 200A and 200B are collectively referred to as IP/MPLS routers 200. The IP/MPLS networks 20A and 20B are collectively referred to as IP/MPLS networks 20, and the MPLS-TP apparatus 100A to 100E are collectively referred to as MPLS-TP apparatus 100.

A user site 30A is coupled to an IP/MPLS router (not shown) that is at an edge of the IP/MPLS network 20A on the user site 30A side. A user site 30B is coupled to an IP/MPLS router (not shown) that is at an edge of the IP/MPLS network 20B on the user site 30B side. In other words, the IP/MPLS networks 20 house the user sites 30.

The IP/MPLS router 200A of the IP/MPLS network 20A and the IP/MPLS router 200B of the IP/MPLS network 20B are coupled to each other via the MPLS-TP network 10, thereby providing a communication service that couples the two user sites 30A and 30B to each other. Specifically, the MPLS-TP apparatus 100, which are used to construct the MPLS-TP network 10, transfer user data transmitted from one of the IP/MPLS routers 200 to the other IP/MPLS router 200 opposite to the sender IP/MPLS router 200.

A virtual router control server (computer) 300 is disposed in the MPLS-TP network 10 in order to cause the MPLS-TP network 10 to seem like one virtual router to the IP/MPLS routers 200.

Each IP/MPLS router 200 transmits/receives control information of its IP/MPLS network 20 to/from an adjacent IP/MPLS router 200. Control information contains, for example, route information on a route within the IP/MPLS network 20 and, receiving this control information, the IP/MPLS router 200 grasps the route information by executing protocol processing of the received control information, such as Open Shortest Path First (OSPF) and Label Distribution Protocol (LDP).

The IP/MPLS router 200 which recognizes the MPLS-TP network 10 as one virtual router transmits the control information to the MPLS-TP network 10, too. The MPLS-TP apparatus 100 used to construct the MPLS-TP network 10 are not capable of processing a protocol layer that corresponds to control information, and therefore transfer the received control information to the virtual router control server 300 to have the virtual router control server 300 execute corresponding processing. The virtual router control server 300 executes processing that corresponds to the control information and, if necessary, sends response information in response to the control information. The virtual router control server 300 also sets various settings to the MPLS-TP apparatus 100 when needed. In the case where the control information contains route information, the virtual router control server 300 can grasp route information of the IP/MPLS network 20.

The virtual router has virtual ports VP1 to VP4, which are identified uniquely from interface (IF) cards 120A to 120N (illustrated in FIG. 2) loaded in each MPLS-TP apparatus 100 and physical ports NP1 to NP4 that the interface cards possess. For each of the virtual ports VP1 to VP4, the network administrator builds in advance a logical path P1 for transferring control information from the virtual port to the virtual router control server 300.

When the MPLS-TP apparatus 100 that is coupled to one of the IP/MPLS routers 200 receives control information from the IP/MPLS router 200, the MPLS-TP apparatus 100 executes ID assigning processing for assigning an intra-MPLS-TP network ID to the received control information, encapsulates, by MPLS-TP, the control information assigned the intra-MPLS-TP network ID, and transfers the encapsulated control information to the virtual router control server 300 over a logical path. An intra-MPLS-TP network ID is identification information by which a logical path to be used for the transmission of control information can be identified (logical path identification information), and details thereof are described with reference to FIG. 3. Details of the ID assigning processing are described with reference to FIGS. 4 and 5.

The control information is received by the MPLS-TP apparatus 100 that is coupled to the virtual router control server 300, and the MPLS-TP apparatus 100 decapsulates the received control information, to thereby restore the received control information to one prior to the encapsulation by the MPLS-TP apparatus 100 that is coupled to the IP/MPLS router 200 and that has transmitted the control information. The decapsulated control information is transmitted to the virtual router control server 300.

The virtual router control server 300 receives the control information, executes processing that corresponds to the received control information, executes ID assigning processing for assigning the intra-MPLS-TP network ID to response information that is a response to the control information, and transmits the response information to the MPLS-TP apparatus 100 that is coupled to the virtual router control server 300.

The MPLS-TP apparatus 100 that is coupled to the virtual router control server 300 receives the response information, encapsulates, by MPLS-TP, the received response information, and transfers the encapsulated response information over a logical path that is identified by the intra-MPLS-TP network ID assigned to the response information.

The MPLS-TP apparatus 100 that is coupled to the IP/MPLS router 200 receives the response information, decapsulates the received response information, and transmits the decapsulated response information to the IP/MPLS router 200.

In this transport system, when the MPLS-TP apparatus 100 that is coupled to one of the IP/MPLS routers 200 receives some data from the IP/MPLS router 200, the MPLS-TP apparatus 100 determines that the received data is user data in the case where an MPLS label is attached to the received data, selects a logical path based on the MPLS label, and transfers the user data to the opposite MPLS-TP apparatus 100 through the MPLS-TP network 10 in order to transfer the user data to the IP/MPLS router 200 that is the destination of the user data.

In the case where no MPLS label is attached to the received data, on the other hand, the MPLS-TP apparatus 100 that is coupled to the IP/MPLS router 200 determines that the received data is control information, and transfers the received control information to the MPLS-TP apparatus 100 that is coupled to the virtual router control server 300 over a logical path that is associated with a physical port that has received the control information, in order to have the virtual router control server 300 execute processing that corresponds to the received control information. The MPLS-TP apparatus 100 in this case executes ID assigning processing for the received control information to assign an intra-MPLS-TP network ID to the control information so that the received control information can be transferred in the MPLS-TP network 10.

With the intra-MPLS-TP network ID assigned to the control information, the virtual router control server 300 can assign the intra-MPLS-TP network ID to response information that is a response to the control information, and the MPLS-TP apparatus 100 that is coupled to the virtual router control server 300 can identify a logical path over which the response information is to be transferred.

Although the first networks and the second network in FIG. 1 are IP/MPLS networks and an MPLS-TP network, respectively, IP networks and a Provider Backbone Bridge-Traffic Engineering (PBB-TE) network may be used as the first networks and the second network, respectively.

Figure 2:
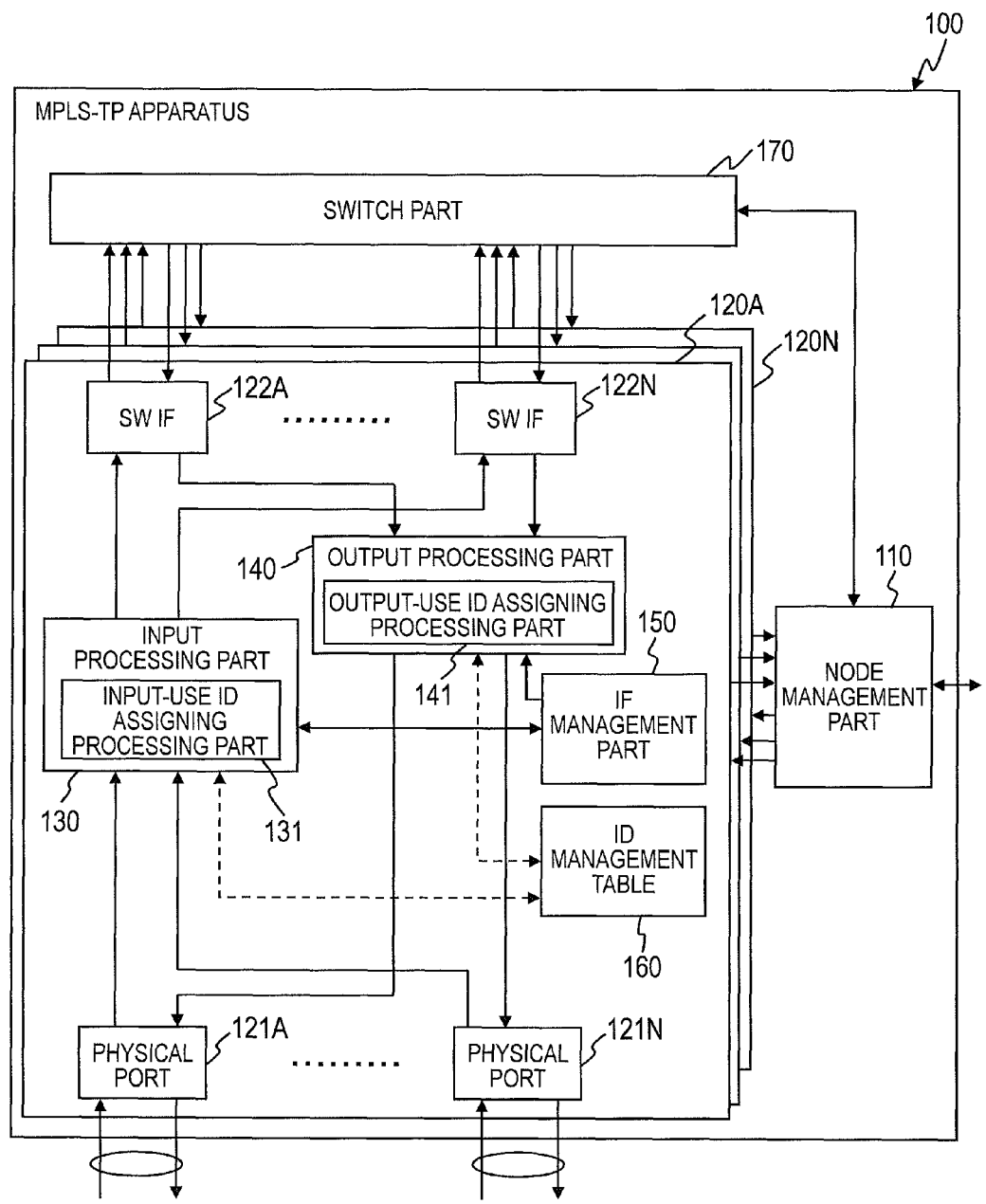
FIG. 2 is a block diagram of an MPLS-TP apparatus according to the first embodiment of this invention.

FIG. 2 is a block diagram of the MPLS-TP apparatus 100 according to the first embodiment of this invention.

Each MPLS-TP apparatus 100 includes a node management part 110, the interface cards 120A to 120N (hereinafter collectively referred to as interface cards 120), and a switch part 170.

The node management part 110 handles the overall management of the MPLS-TP apparatus 100. The interface cards 120 are coupled to other MPLS-TP apparatus 100, one of the IP/MPLS routers 200, and the virtual router control server 300. The switch part 170 executes switching processing for determining, when one of the interface cards 120 receives data, which of the interface cards 120 and physical ports 121A to 121N are the transfer destination of the received data.

Each interface card 120 includes the physical ports 121A to 121N, switch interfaces (SW IFs) 122A to 122N, an input processing part 130, an output processing part 140, an IF management part 150, and an ID management table (management information) 160. The physical ports 121A to 121N are collectively referred to as physical ports 121, and the SW IFs 122A to 122N are collectively referred to as SW IFs 122.

The physical ports 121 are interfaces that are coupled to other MPLS-TP apparatus 100, one of the IP/MPLS routers 200, and the virtual router control server 300. The SW IFs 122 are interfaces that connect the interface cards 120 to the switch part 170.

The input processing part 130 executes input processing for data that is received via one of the physical ports 121. The input processing part 130 has an input-use ID assigning processing part 131. When the received data is control information, the input-use ID assigning processing part 131 refers to the ID management table 160 to execute input-use ID assigning processing for assigning an intra-MPLS-TP network ID to the control information. Details of the input-use ID assigning processing are described with reference to FIGS. 6 and 7.

The output processing part 140 executes output processing for data that is to be transmitted via one of the physical ports 121. The output processing part 140 has an output-use ID assigning processing part 141. When the data to be transmitted is response information to be sent to the IP/MPLS router 200, the output-use ID assigning processing part 141 refers to the ID management table 160 to execute output-use ID assigning processing for assigning a router-side ID that is associated with the intra-MPLS-TP network ID assigned to the control information. A router-side ID is identification information by which a logical path in the IP/MPLS network 20 can be identified, for example, a VLAN ID. Details of the output-use ID assigning processing are described with reference to FIG. 6.

The IF management part 150 controls the input processing part 130 and the output processing part 140.

Registered in the ID management table 160 is the relation between the physical port 121 that has received control information and an intra-MPLS-TP network ID assigned to the control information received by this physical port 121. Details of the ID management table 160 are described with reference to FIG. 3.

The node management part 110 outputs a management-use screen to a display (not shown) for the administrator of the MPLS-TP network 10 to view. The administrator can set various types of information to the MPLS-TP apparatus 100 via the management-use screen. Settings set by the administrator are reflected on the IF management part 150 which is included in each interface card 120.

The node management part 110 also stores initial settings information necessary for the initialization of its MPLS-TP apparatus 100 in a storage apparatus (not shown). The node management part 110 initializes the MPLS-TP apparatus 100 based on the initial settings information or default values.

FIG. 3 is an explanatory diagram of the ID management table 160 according to the first embodiment of this invention.

The ID management table 160 is referred to by the input-use ID assigning processing part 131 when the input-use ID assigning processing part 131 executes the input-use ID assigning processing, and is referred to by the output-use ID assigning processing part 141 when the output-use ID assigning processing part 141 executes the output-use ID assigning processing.

The ID management table 160 includes an apparatus ID 301, an IF ID 302, a physical port ID 303, a router-side ID 304, and an intra-MPLS-TP network ID 305.

Identification information of one of the MPLS-TP apparatus 100 is registered as the apparatus ID 301. Identification information of one of the interface cards 120 is registered as the IF ID 302. Identification information of one of the physical ports 121 is registered as the physical port ID 303.

A virtual port can be identified uniquely by pieces of information registered as the apparatus ID 301, the IF ID 302, and the physical port ID 303. Pieces of information registered as the apparatus ID 301, the IF ID 302, and the physical port ID 303 are therefore collectively referred to as virtual port identification information.

Registered as the router-side ID 304 is a router-side ID that is assigned to control information by the IP/MPLS router 200 and that makes a logical path in the IP/MPLS network 20 identifiable. A router-side ID is, for example, a VLAN tag. The IP/MPLS router 200 does not assign a router-side ID to control information in some cases and, when it is the case, "null" is registered as the router-side ID 304.

Registered as the intra-MPLS-TP network ID 305 is an intra-MPLS-TP network ID that is assigned to control information and that makes a logical path used to transmit the control information identifiable. Intra-MPLS-TP network IDs only need to be unique throughout the MPLS-TP network 10.

The administrator inputs, to an MPLS-TP network management server (not shown), information to be registered in the ID management table 160 of every MPLS-TP apparatus 100 that is coupled to any one of the IP/MPLS routers 200. The administrator inputs the information by taking care that each intra-MPLS-TP network ID registered as the intra-MPLS-TP network ID 305 be unique throughout the MPLS-TP network 10. The MPLS-TP network management server transmits, to the MPLS-TP apparatus 100 that is identified by identification information registered as the apparatus ID 301 in the ID management table 160 which is input by the administrator, an ID management table registration instruction that contains information registered in the entry of this apparatus ID 301. The MPLS-TP apparatus 100 receives the ID management table registration instruction, and registers the information contained in the ID management table registration instruction in its own ID management table 160.

The format of data that is transmitted/received in the IP/MPLS networks 20 is described with reference to FIG. 4. FIG. 4 is an explanatory diagram of the format of data that is transmitted/received in the IP/MPLS networks 20 according to the first embodiment of this invention.

Data transmitted/received in the IP/MPLS networks 20 contains an Ethernet (registered trademark, omitted from now on) header (U) 401, a VLAN tag 402, and a payload 403.

The Ethernet header (U) 401 contains the MAC address of the data's destination, the MAC address of the data's sender, and others. The VLAN tag 402 contains a router-side ID. The payload 403 contains actual data.

The format of data that is transmitted/received in the MPLS/TP network 10 is described with reference to FIG. 5. FIG. 5 is an explanatory diagram of the format of data that is transmitted/received in the MPLS/TP network 10 according to the first embodiment of this invention.

Data transmitted/received in the MPLS-TP network 10 contains, in addition to the Ethernet header (U) 401, the VLAN tag 402, and the payload 403, which are contained in data transmitted/received in the IP/MPLS networks 20, an MPLS label 502 and an Ethernet header (C) 501.

The MPLS label 502 contains an MPLS label that is referred to when the MPLS-TP apparatus 100 transfer the data. The Ethernet header (C) 501 is the same as the Ethernet header (U) 401, and a description thereof is omitted.

Figure 6:
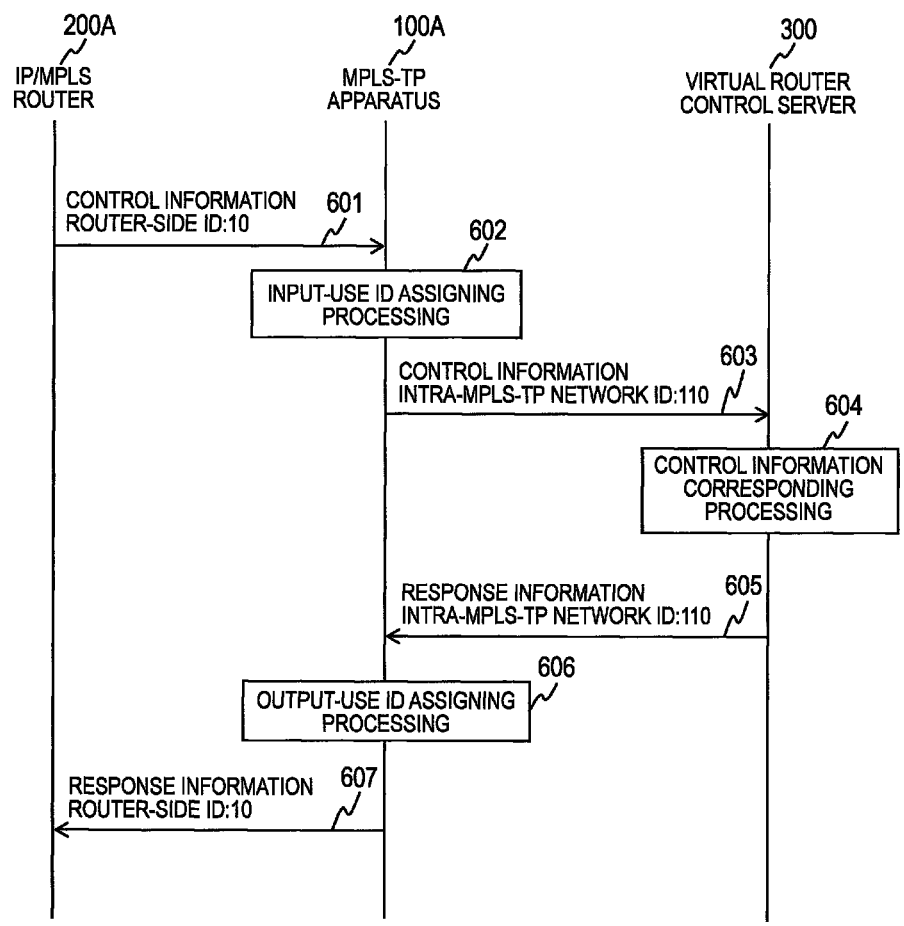
FIG. 6 is a sequence diagram of processing of transmitting/receiving control information and response information in the transport system according to the first embodiment of this invention.

FIG. 6 is a sequence diagram of processing of transmitting/receiving control information and response information in the transport system according to the first embodiment of this invention.

FIG. 6 takes as an example processing of transmitting/receiving control information and response information that is executed when the IP/MPLS router 200A transmits control information that is assigned a router-side ID "10" to the virtual port VP1 of the virtual router.

First, the IP/MPLS router 200A transmits the control information that is assigned the router-side ID "10" to the virtual port VP1 (Step 601). The router-side ID "10" is contained in the VLAN tag 402 of FIG. 4.

The virtual port VP1 here is associated with the physical port NP1 which is included in the interface card 120A of the MPLS-TP apparatus 100A. The MPLS-TP apparatus 100A therefore receives control information transmitted from the IP/MPLS router 200A via the physical port NP1 that the interface card 120A possesses.

When the control information is received by the MPLS-TP apparatus 100A, the input-use ID assigning processing part 131 executes the input-use ID assigning processing for the received control information (Step 602).

Specifically, the input-use ID assigning processing part 131 searches the ID management table 160 for an entry where identification information of the MPLS-TP apparatus 100A ("100A") is registered as the apparatus ID 301, identification information of the interface card 120A ("120A") is registered as the IF ID 302, identification information of the physical port 121 that has received the control information ("NP1") is registered as the physical port ID 303, and a router-side ID that is assigned to the received control information ("10") is registered as the router-side ID 304. The first entry in the ID management table 160 of FIG. 3 is found as a result of the search. From this entry, the input-use ID assigning processing part 131 obtains an intra-MPLS-TP network ID "110" registered as the intra-MPLS-TP network ID 305, converts the router-side ID "10" of the received control information into the obtained intra-MPLS-TP network ID "110", and outputs the control information to the switch part 170 via one of the SW IFs 122.

The VLAN tag 402 of the control information which is illustrated in FIG. 4 is converted from the router-side ID "10" to the intra-MPLS-TP network ID "110" in the manner described above.

Next, the MPLS-TP apparatus 100A transfers the control information to which the intra-MPLS-TP network ID "110" has been assigned in the input-use ID assigning processing to the virtual router control server 300 over a logical path that is identified by the intra-MPLS-TP network ID "110" (Step 603).

Specifically, the switch part 170 of the MPLS-TP apparatus 100A identifies the interface card 120 and the physical port 121 that are associated with the intra-MPLS-TP network ID "110" assigned to the control information by the input-use ID assigning processing part 131, and inputs the control information to the relevant SW IF 122 of the identified interface card 120, which in turn inputs the control information to the output processing part 140.

The output processing part 140 encapsulates the control information by MPLS-TP, and inputs the encapsulated control information to the physical port 121 identified by the switch part 170. The control information is thus transferred to the virtual router control server 300 over a logical path identified by the intra-MPLS-TP network ID "110".

When the control information is encapsulated by MPLS-TP, the format of the control information changes from the one illustrated in FIG. 4 to the one illustrated in FIG. 5. The intra-MPLS-TP network ID "110" contained in the VLAN tag 402 is assigned to the MPLS label 502.

Though not illustrated in FIG. 6, the MPLS-TP apparatus 100B coupled to the virtual router control server 300 receives the control information, decapsulates the received control information, and transmits the decapsulated control information to the virtual router control server 300. The control information, when decapsulated, changes its format from the one illustrated in FIG. 5 to the one illustrated in FIG. 4. The intra-MPLS-TP network ID "110" is assigned to the VLAN tag 402.

The virtual router control server 300 receives the control information transmitted from the MPLS-TP apparatus 100B, and executes protocol processing for the received control information (Step 604). The virtual router control server 300 assigns the intra-MPLS-TP network ID "110" contained in the control information to response information that is a response to the received control information, and transmits the response information to the MPLS-TP apparatus 100B (Step 605). The response information transmitted in Step 605 has the format of FIG. 4, and the intra-MPLS-TP network ID "110" is assigned to the VLAN tag 402 of the response information.

The MPLS-TP apparatus 100B receives the response information from the virtual router control server 300, and encapsulates the received response information by MPLS-TP. The response information, when encapsulated by MPLS-TP, changes its format from the one illustrated in FIG. 4 to the one illustrated in FIG. 5. The intra-MPLS-TP network ID "110" contained in the VLAN tag 402 is assigned to the MPLS label 502.

When the MPLS-TP apparatus 100A receives the response information, the output-use ID assigning processing part 141 executes the output-use ID assigning processing for the received response information (Step 606).

A concrete description on this is given below.

The response information received by the MPLS-TP apparatus 100A is first input to the input processing part 130. The input processing part 130 decapsulates the response information. The response information, when decapsulated, changes its format from the one illustrated in FIG. 5 to the one illustrated in FIG. 4. The VLAN tag 402 is assigned the intra-MPLS-TP network ID "110". The input processing part 130 inputs the decapsulated response information to the switch part 170 via one of the SW IFs 122. The switch part 170 identifies the interface card 120 and the physical port 121 that are to be used for the transmission of the input response information to the IP/MPLS router 200A, and inputs the response information to one of the SW IFs 122 of the identified interface card 120. The SW IF 122 inputs the response information to the output processing part 140.

When the response information is input to the output processing part 140, the output-use ID assigning processing part 141 obtains, from an entry of the ID management table 160 where the intra-MPLS-TP network ID "110" assigned to the response information is registered as the intra-MPLS-TP network ID 305, the router-side ID "10" which is registered as the router-side ID 304. The output-use ID assigning processing part 141 converts the intra-MPLS-TP network ID "110" assigned to the response information into the router-side ID "10". The router-side ID "10" is thus assigned to the VLAN tag 402 of the response information.

The MPLS-TP apparatus 100A next transfers the response information to which the router-side ID "10" has been assigned to the IP/MPLS router 200A (Step 607).

Specifically, the output processing part 140 transfers the response information to the IP/MPLS router 200A by inputting the response information for which the output-use ID assigning processing has been performed by the output-use ID assigning processing part 141 to the physical port 121 that has been identified by the switch part 170

In the manner described above, control information is assigned an intra-MPLS-TP network ID which is managed independently within the MPLS-TP network 10, thereby enabling the virtual router control server 300 to transmit response information that is a response to the control information to the relevant MPLS-TP apparatus 100 with the intra-MPLS-TP network ID assigned to the response information, and enabling the MPLS-TP apparatus 100 to identify a logical path to be used for the transfer of the response information based on the intra-MPLS-TP network ID assigned to the response information. Interworking between the existing IP/MPLS networks 20 and the MPLS-TP network 10 can therefore be accomplished without setting special settings to the existing IP/MPLS networks 20.

Figure 7:
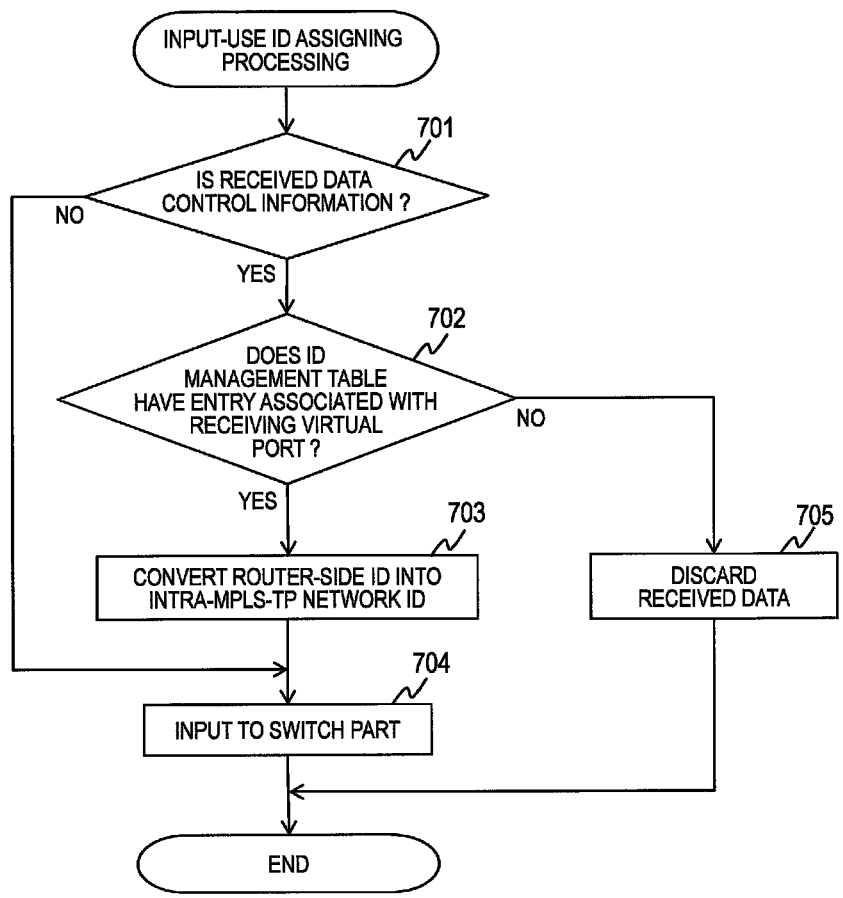
FIG. 7 is a flow chart of an input-use ID assigning processing according to the first embodiment of this invention.

FIG. 7 is a flow chart of the input-use ID assigning processing according to the first embodiment of this invention.

The input-use ID assigning processing is executed by the input-use ID assigning processing part 131 when data received by its own MPLS-TP apparatus 100 is input to the input processing part 130.

First, the input-use ID assigning processing part 131 determines whether or not the data received by the MPLS-TP apparatus 100 is control information (Step 701). Specifically, the input-use ID assigning processing part 131 determines that the received data is user data, not control information, when an MPLS label is attached to the received data, and determines that the received data is control information when no MPLS label is attached to the received data.

When it is determined in Step 701 that the received data is not control information, in other words, that the received data is user data, the input-use ID assigning processing part 131 inputs the received user data to the switch part 170 via one of the SW IFs 122 in order to transfer the received user data to another MPLS-TP apparatus 100 (Step 704), and ends the processing.

When it is determined in Step 701 that the received data is control information, on the other hand, the input-use ID assigning processing part 131 determines whether or not the ID management table 160 has an entry for a virtual port through which the control information has been received (Step 702).

Specifically, the input-use ID assigning processing part 131 determines whether or not the ID management table 160 has an entry where identification information of the MPLS-TP apparatus 100 that includes the physical port 121 that has received the control information is registered as the apparatus ID 301, identification information of the interface card 120A which includes the physical port 121 that has received the control information is registered as the IF ID 302, identification information of the physical port 121 that has received the control information is registered as the physical port ID 303, and a router-side ID assigned to the received control information is registered as the router-side ID 304.

When it is determined in Step 702 that the ID management table 160 does not have an entry for the virtual port through which the control information has been received, the input-use ID assigning processing part 131 discards the received data (Step 705), and ends the processing.

When it is determined in Step 702 that the ID management table 160 has an entry for the virtual port through which the control information has been received, the input-use ID assigning processing part 131 converts the router-side ID assigned to the received control information into an intra-MPLS-TP network ID registered as the intra-MPLS-TP network ID 305 in the entry (Step 703), and proceeds to Step 704. In Step 704, the control information assigned the intra-MPLS-TP network ID is input to the switch part 170 via one of the SW IFs 122, and the processing is ended.

In the manner described above, the MPLS-TP apparatus 100 coupled to the IP/MPLS routers 200 can assign an intra-MPLS-TP network ID by which a logical path to be used for the transmission of received control information is identified.

Second Embodiment

A second embodiment of this invention is described below with reference to FIGS. 8 to 11.

The second embodiment discusses a case in which the virtual router control server 300 transmits response information to the relevant MPLS-TP apparatus 100 without assigning an intra-MPLS-TP network ID that is assigned to control information to the response information.

The MPLS-TP apparatus 100B in this case holds a router address management table (response information management information) 800 in which identification information of the IP/MPLS router 200 that is the sender of control information (a router address) and an intra-MPLS-TP network ID of the IP/MPLS router 200 are associated with each other. When receiving response information from the virtual router control server 300, the MPLS-TP apparatus 100B refers to the router address management table 800 to identify an intra-MPLS-TP network ID that is associated with a router address contained in the control information, assigns the identified intra-MPLS-TP network ID to response information, and transmits the response information.

Response information can thus be transferred to the IP/MPLS router 200 that has transmitted control information without requiring the virtual router control server 300 to assign an intra-MPLS-TP network ID, whereas the virtual router control server 300 of the first embodiment needs to assign an intra-MPLS-TP network ID to response information. Interworking between the existing IP/MPLS networks 20 and the MPLS-TP network 10 can therefore be accomplished without setting special settings to the virtual router control server 300.

The router address management table 800 held in the MPLS-TP apparatus 100B, which is coupled to the virtual router control server 300, is described first with reference to FIG. 8. FIG. 8 is an explanatory diagram of the router address management table 800 according to the second embodiment of this invention.

The router address management table 800 includes a router address 801 and an intra-MPLS-TP network ID 802.

A router address that is identification information of the IP/MPLS router 200 that is the sender of control information is registered as the router address 801. The identification information of the IP/MPLS router 200 registered as the router address 801 may be, for example, the MAC address or IP address of the IP/MPLS router 200.

Registered as the intra-MPLS-TP network ID 802 is an intra-MPLS-TP network ID to be assigned to response information that contains a router address registered as the router address 801 when the MPLS-TP apparatus 100B receives the response information.

Figure 9:
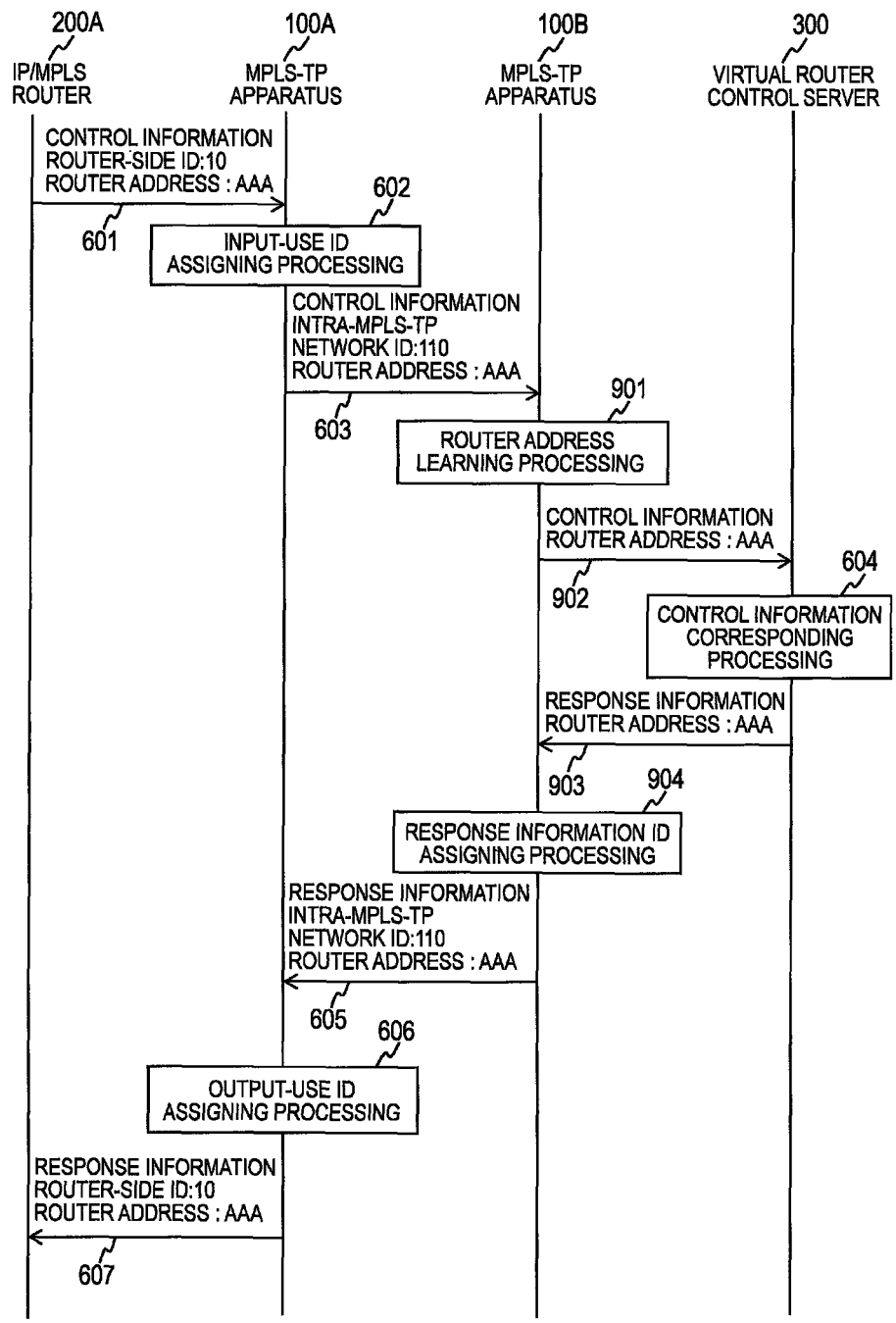
FIG. 9 is a sequence diagram of processing of transmitting/receiving control information and response information in a transport system according to the second embodiment of this invention.

FIG. 9 is a sequence diagram of processing of transmitting/receiving control information and response information in the transport system according to the second embodiment of this invention. In FIG. 9, processing steps that are the same as those in FIG. 6 of the first embodiment are denoted by the same reference symbols, and descriptions thereof are omitted.

In Step 601, the IP/MPLS router 200A transmits to the virtual port VP1 control information in which a router address "AAA" of the IP/MPLS router 200A is contained in the Ethernet header (U) 401 of FIG. 4 and to which a router-side ID "10" is assigned. The control information transmitted/received in the following processing steps contains the router address of the IP/MPLS router 200A, which is the sender of the control information, in the Ethernet header (U) 401.

In Step 602, the MPLS-TP apparatus 100A converts the router-side ID "10" into an intra-MPLS-TP network ID "110". In Step 603, the MPLS-TP apparatus 100A transfers control information that contains the router address "AAA" and that is assigned the intra-MPLS-TP network ID "110".

The MPLS-TP apparatus 100B which is coupled to the virtual router control server 300 receives the control information, and executes router address learning processing in which the router address contained in the control information and the intra-MPLS-TP network ID assigned to the control information are registered in the router address management table 800 (Step 901). Details of the router address learning processing are described with reference to FIG. 10.

The MPLS-TP apparatus 100B next decapsulates the received control information, and transmits the decapsulated control information to the virtual router control server 300 (Step 902). The MPLS-TP apparatus 100B may delete the intra-MPLS-TP network ID assigned to the control information from the control information before transmitting the control information to the virtual router control server 300.

In Step 604, the virtual router control server 300 executes processing that corresponds to the received control information. The virtual router control server 300 then transmits to the MPLS-TP apparatus 100B response information that contains the router address "AAA" contained in the received control information (Step 903).

The MPLS-TP apparatus 100B receives the response information and refers to the router address management table 800 to obtain the intra-MPLS-TP network ID "110" which is associated with the router address "AAA" contained in the response information, and executes response information ID assigning processing for assigning the obtained intra-MPLS-TP network ID to the response information (Step 904). Details of the response information ID assigning processing are described with reference to FIG. 11.

In Step 605, the MPLS-TP apparatus 100B transfers the response information that contains the router address "AAA" and that is assigned the intra-MPLS-TP network ID "110" over a logical path that is identified by the intra-MPLS-TP network ID "110".

In Step 606, the MPLS-TP apparatus 100A executes the output-use ID assigning processing to convert the intra-MPLS-TP network ID "110" assigned to the received response information into the router-side ID "10".

In Step 607, the MPLS-TP apparatus 100A transmits to the IP/MPLS router 200A the response information that contains the router address "AAA" and that is assigned the router-side ID "10".

In this manner, response information can be transferred to the IP/MPLS router 200 that has transmitted control information without requiring the virtual router control server 300 to assign an intra-MPLS-TP network ID to the response information. Interworking between the existing IP/MPLS networks 20 and the MPLS-TP network 10 can therefore be accomplished without setting special settings to the virtual router control server 300.

The MPLS-TP apparatus 100B learns the association between a router address contained in control information and an intra-MPLS-TP network ID each time control information is received. This eliminates the need to set special settings that enable the MPLS-TP apparatus 100B to assign an intra-MPLS-TP network ID to response information.

The router address management table 800 is updated in Step 901 in the description given above. Alternatively, the router address management table 800 may be set in advance in the virtual router control server 300.

Figure 10:
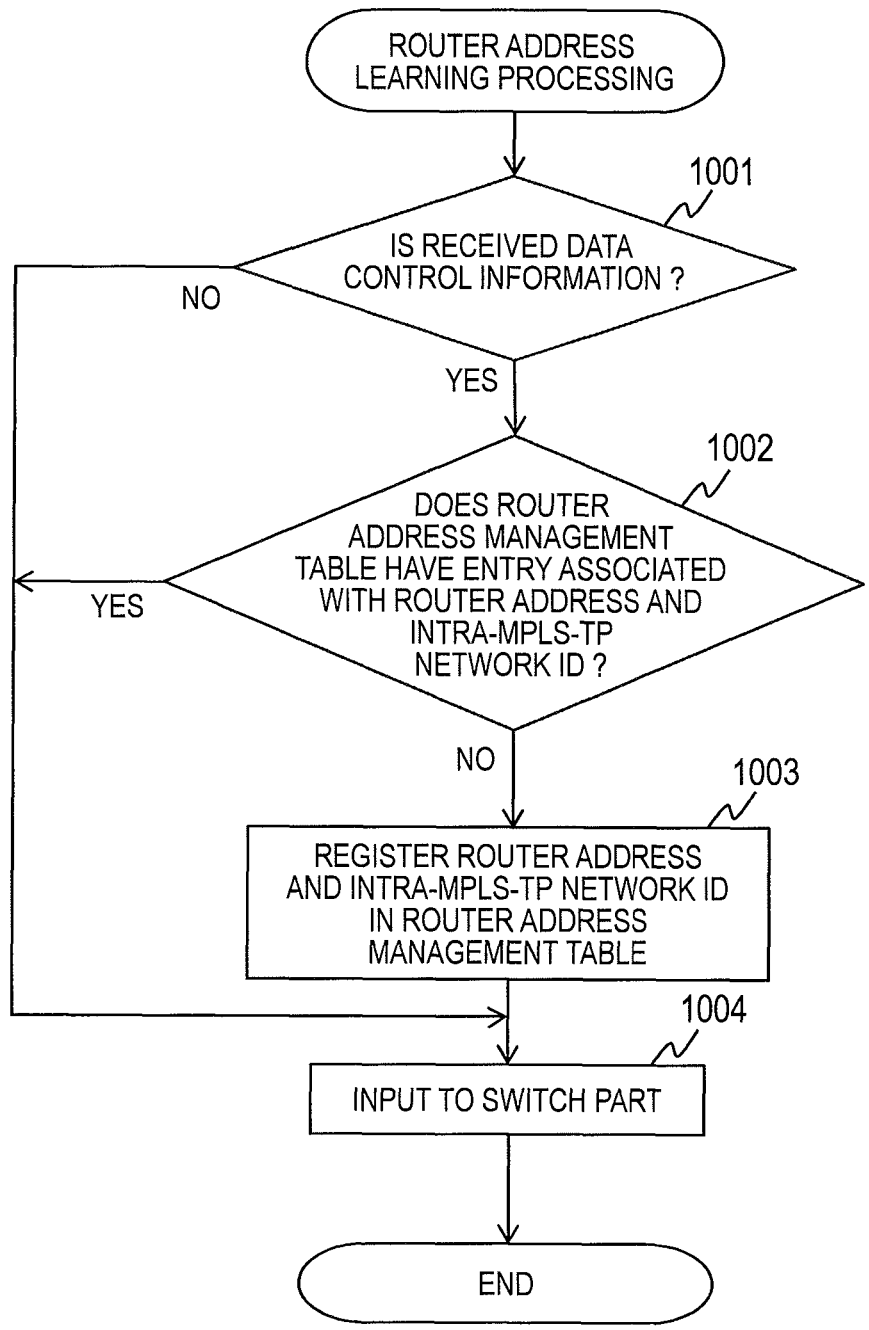
FIG. 10 is a flow chart of router address learning processing according to the second embodiment of this invention.

FIG. 10 is a flow chart of the router address learning processing according to the second embodiment of this invention.

The router address learning processing is executed by the input processing part 130 when the MPLS-TP apparatus 100B receives control information transferred by another MPLS-TP apparatus 100 and the control information is input to the input processing part 130.

The input processing part 130 first determines whether or not the received data is control information transferred by another MPLS-TP apparatus 100 (Step 1001).

The input processing part 130 determines that the received data is control information transferred by another MPLS-TP apparatus 100 in the case where the received data is assigned an intra-MPLS-TP network ID, and determines that the received data is not control information transferred by another MPLS-TP apparatus 100 in the case where the received data is not assigned an intra-MPLS-TP network ID.

When it is determined in Step 1001 that the received data is not control information transferred by another MPLS-TP apparatus 100, the input processing part 130 inputs the received data to the switch part 170 via one of the SW IFs 122 (Step 1004), and ends the processing.

When it is determined in Step 1001 that the received data is control information transferred by another MPLS-TP apparatus 100, on the other hand, the input processing part 130 obtains a router address contained in the control information and an intra-MPLS-TP network ID assigned to the control information.

The MPLS-TP apparatus 100B then determines whether or not the router address management table 800 has an entry where the router address 801 matches the obtained router address and the intra-MPLS-TP network ID 802 matches the obtained intra-MPLS-TP network ID (Step 1002).

When it is determined in Step 1002 that the router address management table 800 does not have such an entry, the input processing part 130 adds a new entry to the router address management table 800, registers the router address contained in the control information and the intra-MPLS-TP network ID assigned to the control information as the router address 801 and the intra-MPLS-TP network ID 802, respectively, in the added entry (Step 1003).

In Step 1004, the input processing part 130 inputs the received control information to the switch part 170 via one of the SW IFs 122, and ends the processing.

When it is determined in Step 1002 that the router address management table 800 has an entry that meets the criteria, it means that the router address contained in the control information and the intra-MPLS-TP network ID assigned to the control information are already associated with each other. The input processing part 130 therefore inputs the received control information to the switch part 170 via one of the SW IFs 122 in Step 1004, and ends the processing.

In the manner described above, the MPLS-TP apparatus 100B which is coupled to the virtual router control server 300 can learn the association between a router address contained in control information and an intra-MPLS-TP network ID assigned to the control information.

Figure 11:
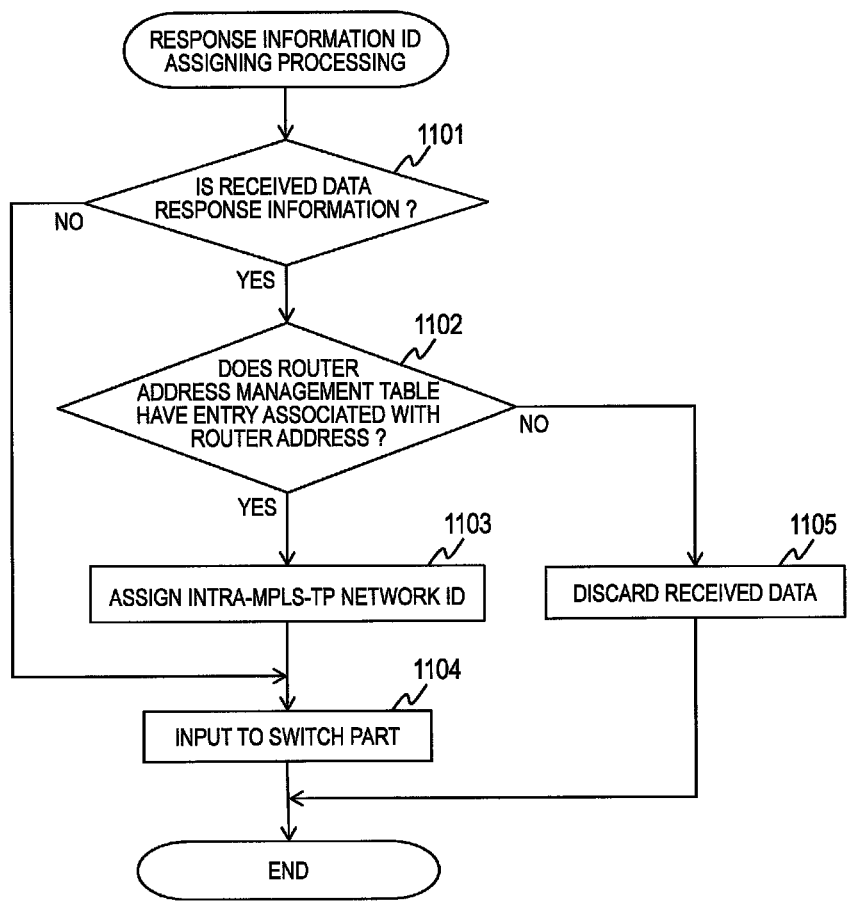
FIG. 11 is a flow chart of response information ID assigning processing according to the second embodiment of this invention.

FIG. 11 is a flow chart of the response information ID assigning processing according to the second embodiment of this invention.

The response information ID assigning processing is executed by the input-use ID assigning processing part 131 of the input processing part 130 when the MPLS-TP apparatus 100B receives response information from the virtual router control server 300 and the response information is input to the input processing part 130.

The input-use ID assigning processing part 131 determines whether or not the received data is response information (Step 1101).

Specifically, the input-use ID assigning processing part 131 determines that the received data is response information when the received data is transmitted from the virtual router control server 300 and is not assigned an MPLS label, and determines that the received data is not response information when the received data is not transmitted from the virtual router control server 300 or is assigned an MPLS label.

When it is determined in Step 1101 that the received data is not response information, the input-use ID assigning processing part 131 inputs the received data to the switch part 170 via one of the SW IFs 122 (Step 1104), and ends the processing.

When it is determined in Step 1101 that the received data is response information, on the other hand, the input-use ID assigning processing part 131 determines whether or not the router address management table 800 has an entry where the router address 801 matches a router address contained in the received response information (Step 1102).

When it is determined in Step 1102 that the router address management table 800 does not have such an entry, the input-use ID assigning processing part 131 discards the received data (Step 1105) and ends the processing. When it is determined in Step 1102 that the router address management table 800 has an entry that meets the criterion, the input-use ID assigning processing part 131 obtains an intra-MPLS-TP network ID that is registered as the intra-MPLS-TP network ID 802 in this entry, and assigns the obtained intra-MPLS-TP network ID to the VLAN tag 402 (illustrated in FIG. 4) of the received response information (Step 1103).

In Step 1104, the input-use ID assigning processing part 131 inputs the response information to which the intra-MPLS-TP network ID is assigned to the switch part 170 via one of the SW IFs 122 (Step 1104), and ends the processing.

In the manner described above, the MPLS-TP apparatus 100B which is coupled to the virtual router control server 300 can assign received response information an intra-MPLS-TP network ID that is associated with a router address contained in the response information.

Third Embodiment

A third embodiment of this invention is described below with reference to FIGS. 12 to 16.

The third embodiment discusses a case in which a redundant logical path is provided from the MPLS-TP apparatus 100 that is coupled to one of the IP/MPLS routers 200 to the virtual router control server 300.

Figure 12:
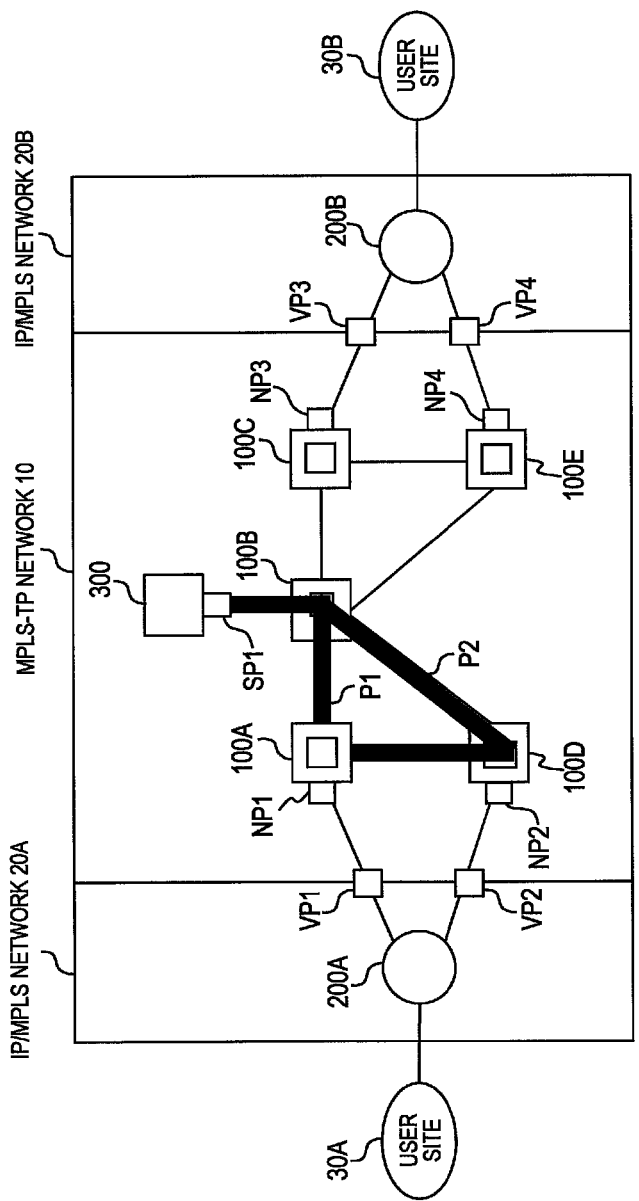
FIG. 12 is an explanatory diagram of a configuration of a transport system according to a third embodiment of this invention.

FIG. 12 is an explanatory diagram of the configuration of a transport system according to the third embodiment of this invention. In FIG. 12, components that are the same as those in FIG. 1 are denoted by the same reference symbols, and descriptions thereof are omitted.

As illustrated in FIG. 12, the transport system of the third embodiment is given logical path redundancy from the MPLS-TP apparatus 100A to the virtual router control server 300 by logical paths P1 and P2.

One of the two logical paths which provide redundancy is set as an active logical path over which control information is actually transferred, and the other logical path is set as a standby logical path over which control information is transferred when a failure or the like occurs in the active logical path.

Each MPLS-TP apparatus 100 uses the ID management table 160 to manage whether a logical path used for the transmission of control information is an active logical path or a standby logical path. Details of the ID management table 160 according to this embodiment are described with reference to FIG. 13.

While FIG. 12 illustrates a case in which logical path redundancy is provided from one MPLS-TP apparatus 100 to the virtual router control server 300 by two logical paths P1 and P2, three or more logical paths may be set to provide redundancy. In the case where logical path redundancy is provided from one MPLS-TP apparatus 100 to the virtual router control server 300 by three or more logical paths, one of the logical paths is set as an active logical path and the rest of the logical paths are set as standby logical paths.

Described below is a case of applying the third embodiment to the transport system of the first embodiment. A case of applying the third embodiment to the transport system of the second embodiment is described later.

FIG. 13 is an explanatory diagram of the ID management table 160 according to the third embodiment of this invention. In FIG. 13, components that are the same as those in FIG. 3 are denoted by the same reference symbols, and descriptions thereof are omitted.

The ID management table 160 includes the apparatus ID 301, the IF ID 302, the physical port ID 303, the router-side ID 304, the intra-MPLS-TP network ID 305, and redundancy information 1301.

Registered as the intra-MPLS-TP network ID 305 are intra-MPLS-TP network IDs by which a plurality of logical paths for providing redundancy in the transmission of control information received via a virtual port can be identified.

Registered as the redundancy information 1301 is information that indicates, for each logical path that is identified by an intra-MPLS-TP network ID registered as the intra-MPLS-TP network ID 305, whether the logical path is an active logical path or a standby logical path.

How the redundancy information 1301 is updated is described.

Information registered as the redundancy information 1301 in the initial state is registered by the administrator in advance. When one of the MPLS-TP apparatus 100 detects a failure in a logical path set as an active logical path, the MPLS-TP apparatus 100 autonomously sets a standby logical path as an active logical path, changes the redundancy information 1301 for the logical path that has been set as an active logical path to "standby logical path", and changes the redundancy information 1301 for the logical path that has been set as a standby logical path to "active logical path".

The MPLS-TP apparatus 100 in this case transmits, to other MPLS-TP apparatus 100, redundancy information update information for informing that a logical path that has been set as an active logical path is changed to a standby logical path, and that a logical path that has been set as a standby path is changed to an active logical path. The other MPLS-TP apparatus 100 receive the redundancy information update information and each update the redundancy information 1301 of its own ID management table 160 based on the received update information.

The MPLS-TP apparatus 100 that has detected a failure in a logical path set as an active logical path may transmit failure detection information for informing that the MPLS-TP apparatus 100 has detected a failure in a logical path to the MPLS-TP network management server (not shown). The MPLS-TP network management server receives the failure detection information, sets a standby logical path as an active logical path based on the received failure detection information, and transmits the redundancy information update information described above to all MPLS-TP apparatus 100.

The MPLS-TP apparatus 100 receive the redundancy information update information, and each update the redundancy information 1301 of its own ID management table 160 based on the received update information.

The description given above deals with switching between an active logical path and a standby logical path that is executed when one of the MPLS-TP apparatus 100 detects a failure in an active logical path. Switching between an active logical path and a standby logical path may be based on the state of logical paths and may be executed when, for example, the load on an active logical path of one of the MPLS-TP apparatus 100 is equal to or more than a threshold.

Processing of transmitting/receiving control information and response information in the transport system of the third embodiment is described next. This processing differs from that of the first embodiment in the input-use ID assigning processing (Step 602 of FIG. 6) that is executed when the MPLS-TP apparatus 100A receives control information from the IP/MPLS router 200A. The input-use ID assigning processing according to the third embodiment is described with reference to FIG. 14.

Figure 14:
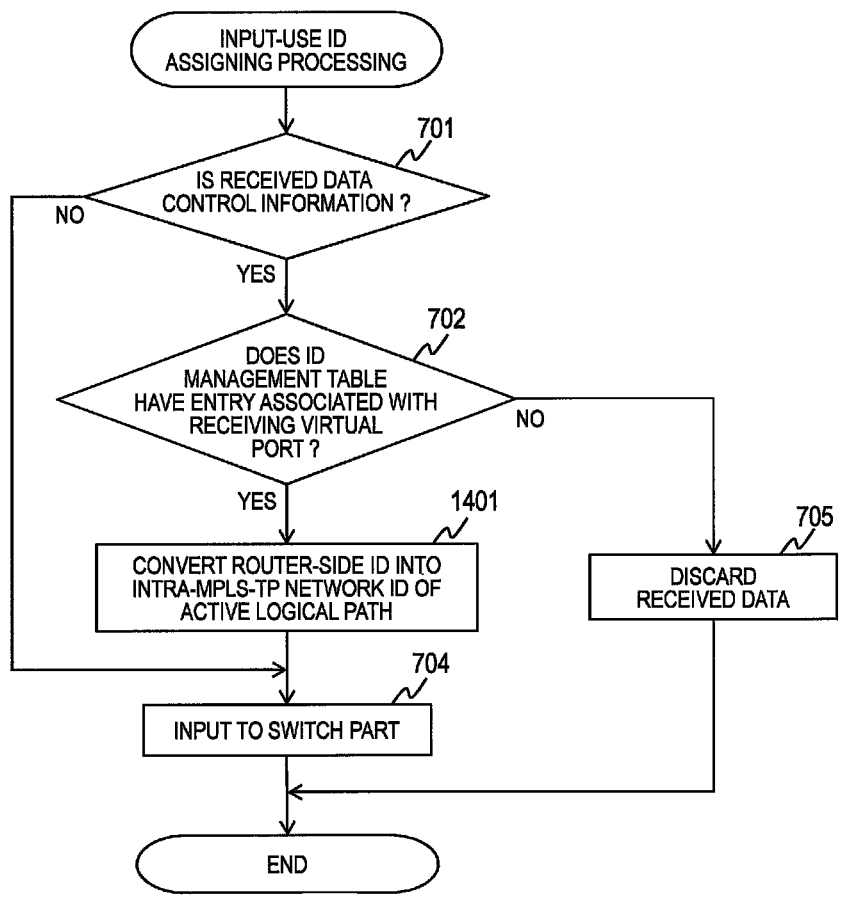
FIG. 14 is a flow chart of input-use ID assigning processing according to the third embodiment of this invention.

FIG. 14 is a flow chart of the input-use ID assigning processing according to the third embodiment of this invention. In FIG. 14, processing steps that are the same as those in FIG. 7 are denoted by the same reference symbols, and descriptions thereof are omitted.

When it is determined in Step 702 that the ID management table 160 has an entry for the virtual port through which the control information has been received, the input-use ID assigning processing part 131 identifies an entry where information that indicates an active logical path is registered as the redundancy information 1301 out of entries for the virtual port through which the control information has been received. The input-use ID assigning processing part 131 converts the router-side ID of the received control information into an intra-MPLS-TP network ID that is registered as the intra-MPLS-TP network ID 305 in the identified entry (Step 1401), and then proceeds to Step 704.

In this manner, the transport system that is given logical path redundancy enables the MPLS-TP apparatus 100 that has received control information from one of the IP/MPLS routers 200 to transfer the control information over a logical path that is set as an active logical path, and accordingly provides highly reliable coupling between the IP/MPLS networks 20 and the virtual router control server 300.

A case of applying the third embodiment to the transport system of the second embodiment is described next as a modification example of the third embodiment.

In this modification example, the MPLS-TP apparatus 100 that is coupled to the virtual router control server 300 holds the router address management table 800. When receiving response information from the virtual router control server 300, the MPLS-TP apparatus 100 assigns the response information the intra-MPLS-TP network ID of a logical path that is set as an active logical path out of intra-MPLS-TP network IDs that are associated with a router address contained in the received response information, and then transfers the response information.

The router address management table 800 of this modification example is described with reference to FIG. 15. FIG. 15 is an explanatory diagram of the router address management table 800 according to the modification example of the third embodiment of this invention. In FIG. 15, components that are the same as those in FIG. 8 are denoted by the same reference symbols, and descriptions thereof are omitted.

The router address management table 800 includes the router address 801, the intra-MPLS-TP network ID 802, and redundancy information 1501.

Registered as the intra-MPLS-TP network ID 802 are intra-MPLS-TP network IDs by which a plurality of logical paths for providing redundancy in the transmission of response information can be identified.

Registered as the redundancy information 1501 is information that indicates, for each logical path that is identified by an intra-MPLS-TP network ID registered as the intra-MPLS-TP network ID 305, whether the logical path is an active logical path or a standby logical path.

Figure 16:
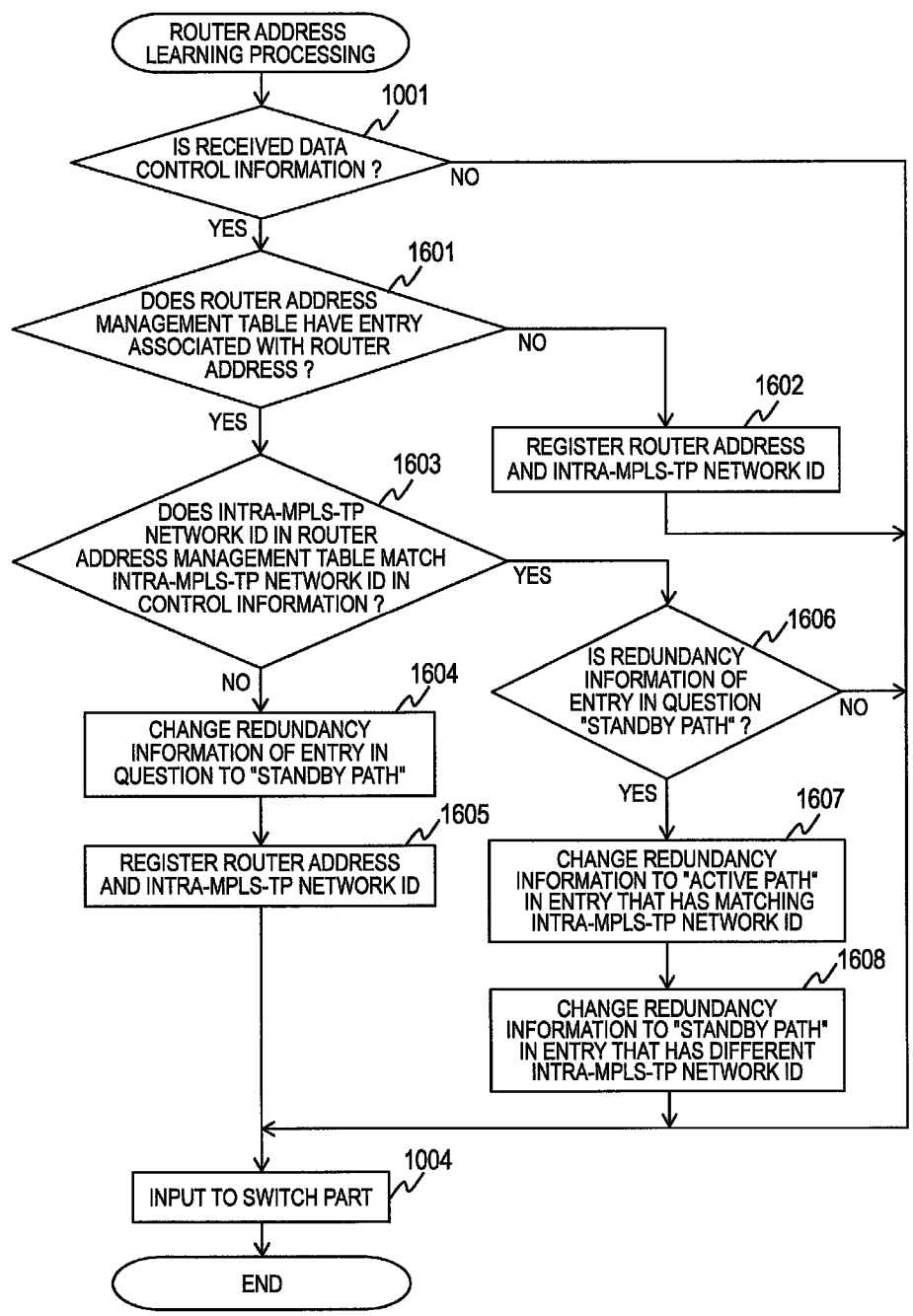
FIG. 16 is a flow chart of router address learning processing according to the modification example of the third embodiment of this invention.

Details of how the redundancy information 1501 of the router address management table 800 is updated are described with reference to FIG. 16.

Processing of transmitting/receiving control information and response information in the transport system of this modification example is described next with reference to FIG. 9.

The transmission/reception processing of this modification example differs from that of FIG. 9 in the input-use ID assigning processing (Step 602), the router address learning processing (Step 901), and the response information ID assigning processing (Step 905).

Input-use ID assigning processing of this modification example is the same as the input-use ID assigning processing illustrated in FIG. 14, and a description thereof is omitted.

Router address learning processing of this modification example is described with reference to FIG. 16. FIG. 16 is a flow chart of the router address learning processing according to the modification example of the third embodiment of this invention. In FIG. 16, processing steps that are the same as those in FIG. 10 are denoted by the same reference symbols, and descriptions thereof are omitted.

When it is determined in Step 1001 that the received data is control information, the input processing part 130 refers to the router address management table 800 to determine whether or not there is an entry where the router address 801 matches a router address contained in the control information (Step 1601).

When it is determined in Step 1601 that there is no entry where the router address 801 matches the router address contained in the control information, the input processing part 130 adds a new entry to register in the added entry the router address contained in the control information, an intra-MPLS-TP network ID assigned to the control information, and information indicating an active logical path as the router address 801, the intra-MPLS-TP network ID 802, and the redundancy information 1501, respectively (Step 1602). The input processing part 130 then proceeds to Step 1004.

When it is determined in Step 1601 that there is an entry where the router address 801 matches a router address contained in the control information, on the other hand, the input processing part 130 determines whether or not an intra-MPLS-TP network ID that is registered as the intra-MPLS-TP network ID 802 in the found entry matches the intra-MPLS-TP network ID assigned to the control information (Step 1603).

When it is determined in Step 1603 that the intra-MPLS-TP network ID that is registered as the intra-MPLS-TP network ID 802 in the found entry differs from the intra-MPLS-TP network ID assigned to the control information, the input processing part 130 determines that a logical path used for the transmission of transfer information has been switched, and registers information that indicates a standby logical path as the redundancy information 1501 in each entry where the router address 801 matches the router address contained in the control information and the intra-MPLS-TP network ID 802 differs from the intra-MPLS-TP network ID assigned to the control information (Step 1604).

The input processing part 130 then adds a new entry to the router address management table 800 to register in the added entry the router address contained in the control information, the intra-MPLS-TP network ID assigned to the control information, and information that indicates an active logical path as the router address 801, the intra-MPLS-TP network ID 802, and the redundancy information 1501, respectively (Step 1605). The input processing part 130 then proceeds to Step 1004.

When it is determined in Step 1603 that the intra-MPLS-TP network ID that is registered as the intra-MPLS-TP network ID 802 in the found entry matches the intra-MPLS-TP network ID assigned to the control information, on the other hand, the input processing part 130 determines whether or not information that indicates a standby logical path is registered as the redundancy information 1501 in an entry where the router address 801 matches the router address contained in the control information and the intra-MPLS-TP network ID 802 matches the intra-MPLS-TP network ID assigned to the control information (Step 1606).

When it is determined in Step 1606 that information that indicates a standby logical path is registered as the redundancy information 1501 in an entry where the router address 801 matches the router address contained in the control information and the intra-MPLS-TP network ID 802 matches the intra-MPLS-TP network ID assigned to the control information, the input processing part 130 registers information that indicates an active logical path as the redundancy information 1501 in this entry because a logical path that is identified by the intra-MPLS-TP network ID assigned to the control information has been set as an active logical path (Step 1607).

The input processing part 130 then registers information that indicates a standby logical path as the redundancy information 1501 in each entry where the router address 801 matches the router address contained in the control information and the intra-MPLS-TP network ID 802 differs from the intra-MPLS-TP network ID assigned to the control information (Step 1608), and proceeds to Step 1004.

When it is determined in Step 1606 that information that indicates an active logical path is registered as the redundancy information 1501 in an entry where the router address 801 matches the router address contained in the control information and the intra-MPLS-TP network ID 802 matches the intra-MPLS-TP network ID assigned to the control information, on the other hand, the input processing part 130 proceeds to Step 1004.

In the manner described above, when receiving control information, the MPLS-TP apparatus 100 that is coupled to the virtual router control server 300 can register the association between a router address contained in the control information and an intra-MPLS-TP network ID assigned to the control information in the router address management table 800 based on the received control information, and can also update the redundancy information 1501.

The MPLS-TP apparatus 100 that is coupled to the virtual router control server 300 changes the ID management table 160 and the router address management table 800 when the redundancy information update information is received from the MPLS-TP apparatus 100 that has switched its logical path or from the MPLS-TP network management server (not shown).

Response information ID assigning processing (Step 905) of this modification example is described next with reference to FIG. 11. The response information ID assigning processing of this modification example differs from that of FIG. 11 in Step 1103. Specifically, the input-use ID assigning processing part 131 identifies an entry where information that indicates an active logical path is registered as the redundancy information 1501 out of entries of the router address management table 800 for a router address of the received response information. The input-use ID assigning processing part 131 assigns an intra-MPLS-TP network ID that is registered as the intra-MPLS-TP network ID 305 in the identified entry to the router-side ID of the received response information, and then proceeds to Step 1104.

In this manner, when receiving response information from the virtual router control server 300, the MPLS-TP apparatus 100B which is coupled to the virtual router control server 300 can assign the received response information an intra-MPLS-TP network ID that is associated with a router address and by which an active logical path can be identified.

Fourth Embodiment

A fourth embodiment of this invention is described below with reference to FIGS. 17 and 18.

The fourth embodiment discusses a case in which a different virtual router control server 300 executes processing that corresponds to control information for each different protocol.

Figure 17:
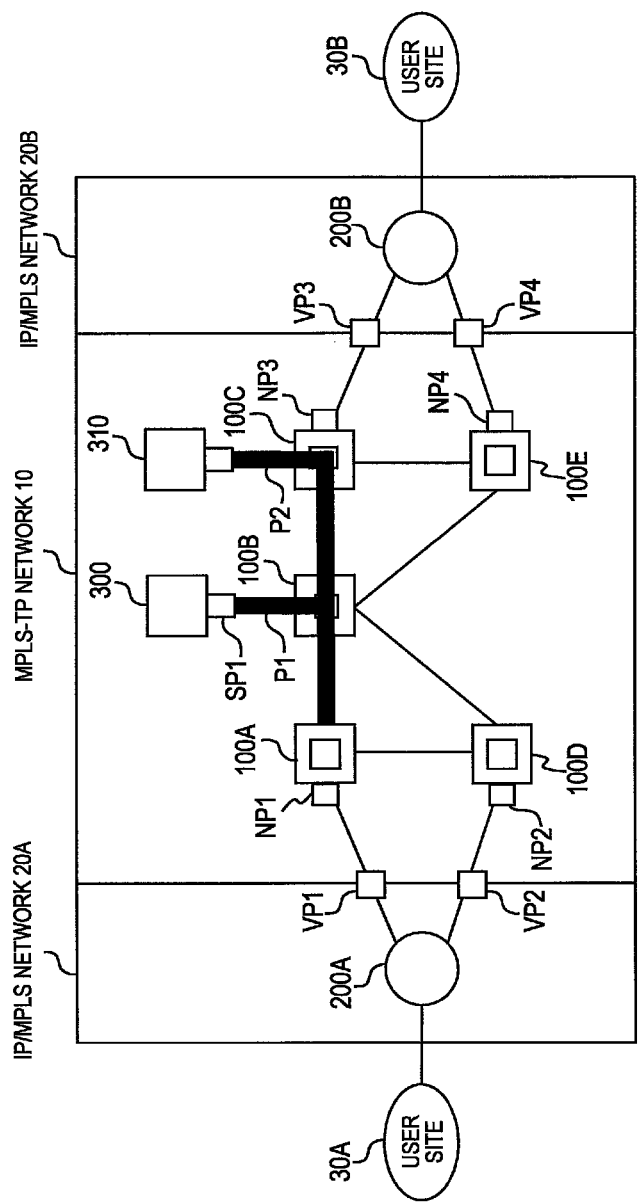
FIG. 17 is an explanatory diagram of a transport system according to a fourth embodiment of this invention.

FIG. 17 is an explanatory diagram of a transport system according to the fourth embodiment of this invention. In FIG. 17, components that are the same as those in FIGS. 1 and 12 are denoted by the same reference symbols, and descriptions thereof are omitted.

The transport system of the fourth embodiment includes the virtual router control server 300 for executing processing that corresponds to control information whose protocol is, for example, OSPF, and a virtual router control server 310 for executing processing that corresponds to control information whose protocol is, for example, LDP.

The MPLS-TP apparatus 100A transfers received control information to the virtual router control server 300 over the logical path P1 when the protocol of the received control information is OSPF, and transfers received control information to the virtual router control server 310 over the logical path P2 when the protocol of the received control information is LDP.

By thus selectively using one of the virtual router control servers 300 and 310 to execute processing that corresponds to control information depending on the protocol type of the control information, processing load can be distributed between the virtual router control servers 300 and 310.

Described below is a case where a different virtual router control server 300 executes processing that corresponds to control information for each different protocol of control information in the transport system of the first embodiment.

FIG. 18 is an explanatory diagram of the ID management table 160 according to the fourth embodiment of this invention. In FIG. 18, components that are the same as those in FIG. 3 are denoted by the same reference symbols, and descriptions thereof are omitted.

The ID management table 160 includes the apparatus ID 301, the IF ID 302, the physical port ID 303, the router-side ID 304, a protocol type 1801, and the intra-MPLS-TP network ID 305.

Information indicating the protocol type of control information is registered as the protocol type 1801. Registered as the intra-MPLS-TP network ID 305 is an intra-MPLS-TP network ID to be used in the transmission of the control information which is determined in relation to a virtual port through which the control information has been received, a router-side ID assigned to the control information, and the protocol type of the control information.

Processing of transmitting/receiving control information and response information in the transport system of the fourth embodiment is described next. This processing differs from that of the first embodiment in the input-use ID assigning processing (Step 602 of FIG. 6) that is executed when the MPLS-TP apparatus 100A receives control information from the IP/MPLS router 200A.

The input-use ID assigning processing according to the fourth embodiment is described with reference to FIG. 7. The input-use ID assigning processing of the fourth embodiment differs from the input-use ID assigning processing of FIG. 7 in Step 703.

In Step 703 of the fourth embodiment, the input-use ID assigning processing part 131 identifies the protocol type of the received control information, and identifies an intra-MPLS-TP network ID registered in an entry of the ID management table 160 where the protocol type 1801 matches the identified protocol type out of entries for the virtual port through which the control information has been received. The input-use ID assigning processing part 131 converts the router-side ID assigned to the received control information into the identified intra-MPLS-TP network ID, and proceeds to Step 704.

The MPLS-TP apparatus 100 can thus transmit control information to one of the virtual router control server 300 and the virtual router control server 310 that is associated with the protocol type of the control information, and processing load is distributed between the virtual router control servers 300 and 310.

In a case of applying the fourth embodiment to the transport system of the second embodiment, too, the input-use ID assigning processing differs from that of the second embodiment (Step 602 of FIG. 9) and is the same as the one described above. A description on this application is therefore omitted.

In the manner described above, processing load per virtual router control server 300 can be lessened by using a different virtual router control server 300 to execute processing that corresponds to control information for each different protocol type of control information.

Fifth Embodiment

A fifth embodiment of this invention is described below with reference to FIGS. 19 and 20.

After executing processing that corresponds to control information, the virtual router control server 300 stores the result of executing the processing in a database. In the case where the database is to have a redundancy configuration, the virtual router control server 300 could copy the database to another virtual router control server at given timing. However, inconsistency is generated between the database in the virtual router control server 300 and the database in the other virtual router control server if a failure occurs.

In the fifth embodiment which addresses this problem, the MPLS-TP apparatus 100 that is coupled to one of the IP/MPLS routers 200 copies received control information and transmits the copies of the control information to a plurality of virtual router control servers, and processing that corresponds to the received control information is executed by the plurality of virtual router control servers. This enables a plurality of virtual router control servers to hold the same database.

A case of applying the fifth embodiment to the transport system of the first embodiment is described first.

A transport system of the fifth embodiment has the same configuration as that of the fourth embodiment which is illustrated in FIG. 17, and is described with reference to FIG. 17.

The transport system of the fifth embodiment includes the virtual router control servers 300 and 310. The logical path P1 is built from the MPLS-TP apparatus 100A, which is coupled to the IP/MPLS router 200A, to the virtual router control server 300, and the logical path P2 is built from the MPLS-TP apparatus 100A, which is coupled to the IP/MPLS router 200A, to the virtual router control server 310. The virtual router control server 300 is set as an active server and the virtual router control server 310 is set as a standby server.

The MPLS-TP apparatus 100A receives control information from the IP/MPLS router 200A, and copies the received control information to transfer one copy of the control information to the virtual router control server 300 over the logical path P1 and transfer the other copy of the control information to the virtual router control server 310 over the logical path P2.

The virtual router control servers 300 and 310 each receive a copy of the control information, execute processing that corresponds to the received copy of control information, store the result of executing the processing in a database, and transmit response information.

The MPLS-TP apparatus 100A receives the response information from each of the virtual router control servers 300 and 310, discards the response information from the virtual router control server 310 which is set as a standby server, and transmits to the IP/MPLS router 200A the response information from the virtual router control server 300 which is set as an active server.

The ID management table 160 of the MPLS-TP apparatus 100 that is coupled to one of the IP/MPLS routers 200 is described next with reference to FIG. 19. FIG. 19 is an explanatory diagram of the ID management table 160 according to the fifth embodiment of this invention. In FIG. 19, components that are the same as those in FIG. 3 are denoted by the same reference symbols, and descriptions thereof are omitted.

The ID management table 160 includes the apparatus ID 301, the IF ID 302, the physical port ID 303, the router-side ID 304, the intra-MPLS-TP network ID 305, and server redundancy information 1901.

Registered as the intra-MPLS-TP network ID 305 is an intra-MPLS-TP network ID by which a logical path to be used in the transmission of a copy of control information that has been copied by the MPLS-TP apparatus 100 can be identified. Registered as the server redundancy information 1901 is information indicating whether a virtual router control server that receives the control information via a logical path that is identified by an intra-MPLS-TP network ID registered as the intra-MPLS-TP network ID 305 is set as an active server or a standby server.

Processing of transmitting/receiving control information and response information in a case of applying the fifth embodiment to the transport system of the first embodiment is described next. This processing differs from that of the first embodiment in the input-use ID assigning processing (Step 602 of FIG. 6) that is executed when the MPLS-TP apparatus 100A receives control information from the IP/MPLS router 200A, and the output-use ID assigning processing (Step 606 of FIG. 6) that is executed when the MPLS-TP apparatus 100A receives response information.

The input-use ID assigning processing according to the fifth embodiment is described. The input-use ID assigning processing of the fifth embodiment differs from the input-use ID assigning processing of FIG. 7 in Step 703.

Step 703 of the fifth embodiment is described. The input-use ID assigning processing part 131 first identifies an entry of the ID management table 160 for a virtual port through which the control information has been received, and makes as many copies of the received control information as the count of identified entries.

The input-use ID assigning processing part 131 selects one copy of the control information that is a processing target out of the copies of the control information, and converts a router-side ID contained in the processing target control information into an intra-MPLS-TP network ID that is registered as the intra-MPLS-TP network ID 305 in one of the identified entries. The input-use ID assigning processing part 131 repeats this processing until the router-side ID of every copy of the control information is converted into an intra-MPLS-TP network ID.

The MPLS-TP apparatus 100 thus makes as many copies of control information as the count of virtual router control servers (here, two virtual router control servers, 300 and 310) so that, for each copy of the control information, a router-side ID contained in the copy can be converted into an intra-MPLS-TP network ID by which a logical path used for transmission can be identified.

The virtual router control servers 300 and 310 each receive a copy of control information, execute processing that corresponds to the received copy of the control information, store the result of executing the processing in a database, and transmit response information to which an intra-MPLS-TP network ID assigned to the received copy of the control information is assigned.

Output-use ID assigning processing of the fifth embodiment is described next. The output-use ID assigning processing is executed by the output-use ID assigning processing part 141 when its own MPLS-TP apparatus 100 receives response information and the received response information is input to the output processing part 140.

The output-use ID assigning processing part 141 determines whether or not information that indicates an active server is registered as the server redundancy information 1901 in an entry of the ID management table 160 where an intra-MPLS-TP network ID assigned to the response information is registered as the intra-MPLS-TP network ID 305. When it is determined that information that indicates an active server is registered as the server redundancy information 1901 in this entry, the output-use ID assigning processing part 141 converts the intra-MPLS-TP network ID contained in the input response information into a router-side ID that is registered as the router-side ID 304 in the entry.

When it is determined that information that indicates a standby server is registered as the server redundancy information 1901 in the entry, on the other hand, the output-use ID assigning processing part 141 discards the input response information.

The IP/MPLS router 200 that has transmitted control information is prevented from receiving a plurality of pieces of response information in the manner described above.

A case of applying the fifth embodiment to the transport system of the second embodiment is described next as a modification example of the fifth embodiment.

Response information from a virtual router control server that is set as a standby server in this case may be discarded by the MPLS-TP apparatus 100 that is coupled to this virtual router control server, or may be discarded by the MPLS-TP apparatus 100 that is coupled to the sender IP/MPLS router 200.

A transport system in which response information from a virtual router control server that is set as a standby server is discarded by the MPLS-TP apparatus 100 that is coupled to the sender IP/MPLS router 200 can be implemented by the same processing as the one described in the fifth embodiment.

A transport system in which response information from a virtual router control server that is set as a standby server is discarded by the MPLS-TP apparatus 100 that is coupled to the virtual router control server is described below.

FIG. 20 is an explanatory diagram of the router address management table 800 according to the modification example of the fifth embodiment of this invention. In FIG. 20, components that are the same as those in FIG. 8 are denoted by the same reference symbols, and descriptions thereof are omitted.

The router address management table 800 includes the router address 801, the intra-MPLS-TP network ID 802, and server redundancy information 2001.

An intra-MPLS-TP network ID by which a logical path to be used for the transmission of response information can be identified is registered as the intra-MPLS-TP network ID 802. Registered as the server redundancy information 2001 is information indicating whether a sender virtual router control server which transfers response information over a logical path that is identified by an intra-MPLS-TP network ID registered as the intra-MPLS-TP network ID 802 is set as an active server or a standby server (server redundancy information).

Processing of transmitting/receiving control information and response information in the modification example of the fifth embodiment differs from that of the second embodiment in the input-use ID assigning processing (Step 602), router address learning processing (Step 901), and response information ID assigning processing (Step 905) of FIG. 9.

In input-use ID assigning processing (Step 602) of this modification example, the input-use ID assigning processing part 131 copies control information and converts, for each copy of the control information, the router-side ID of the copy of the control information into an intra-MPLS-TP network ID as described in the fifth embodiment. The input-use ID assigning processing part 131 in this case assigns, to the copy of the control information, information that is registered as the server redundancy information 1901 in an entry where the intra-MPLS-TP network ID assigned to the copy of the control information is registered as the intra-MPLS-TP network ID 305.

Router address learning processing (Step 901) of this modification example differs from the router address learning processing of FIG. 10 in Step 1003.

In Step 1003 of this modification example, the input processing part 130 adds a new entry to the router address management table 800 to register in the added entry a router address contained in the control information, an intra-MPLS-TP network ID assigned to the control information, and server redundancy information assigned to the control information as the router address 801, the intra-MPLS-TP network ID 802, and the server redundancy information 2001, respectively.

In this manner, when the MPLS-TP apparatus 100 that is coupled to a virtual router control server receives control information and updates the router address management table 800, the MPLS-TP apparatus 100 can update not only the router address 801 and the intra-MPLS-TP network ID 802 but also the server redundancy information 2001.

In response information ID assigning processing (Step 905) of this modification example, when it is determined in Step 1102 of the response information ID assigning processing of FIG. 11 that the router address management table 800 has an entry where the router address 801 matches a router address contained in the received response information, the input-use ID assigning processing part 131 determines whether or not information that indicates an active server is registered as the server redundancy information 2001 in the found entry.

When it is determined that information that indicates an active server is registered as the server redundancy information 2001 in the found entry, the input-use ID assigning processing part 131 proceeds to Step 1103 to assign an intra-MPLS-TP network ID to the received response information.

When it is determined that information that indicates a standby server is registered as the server redundancy information 2001 in the found entry, on the other hand, the input-use ID assigning processing part 131 proceeds to Step 1104 to discard the received response information.

In the manner described above, response information from a virtual router control server that is set as a standby server can be discarded by the MPLS-TP apparatus 100 that is coupled to the virtual router control server, which means that the transfer of unnecessary response information in the MPLS-TP network 10 is prevented, and traffic in the MPLS-TP network 10 is lightened.

Sixth Embodiment

A sixth embodiment of this invention is described below with reference to FIGS. 21 and 22.

The first to fifth embodiments have discussed a case of assigning an intra-MPLS-TP network ID to the VLAN tag 402 of the packet that is illustrated in FIGS. 4 and 5. The sixth embodiment discusses a case of assigning an intra-MPLS-TP network ID to an IP 4031 (illustrated in FIGS. 21 and 22) of the payload 403 in a packet.

FIG. 21 is an explanatory diagram of the format of data that is transmitted/received in the IP/MPLS networks 20 according to the sixth embodiment of this invention. In FIG. 21, components that are the same as those in FIG. 4 are denoted by the same reference symbols, and descriptions thereof are omitted.

Though omitted from FIG. 4, the IP 4031 which is an area for storing an IP address is included in the payload 403.

The MPLS-TP apparatus 100 that has received control information from one of the IP/MPLS routers 200 assigns an intra-MPLS-TP network ID to the IP 4031 in the input-use ID assigning processing, encapsulates the control information by IP, further encapsulates the control information by MPLS, and transfers the control information in the MPLS-TP network 10.

The format of the data encapsulated and transmitted/received in the MPLS-TP network 10 is described with reference to FIG. 22. FIG. 22 is an explanatory diagram of the format of data that is transmitted/received in the MPLS-TP network 10 according to the sixth embodiment of this invention.

When the data of FIG. 21 is encapsulated by IP, an Ethernet header 2101, an IP 2102, and Generic Routing Encapsulation (GRE) 2103 are attached to the data of FIG. 21.

The Ethernet header 2101 contains the MAC address of the data's destination, the MAC address of the data's sender, and others. The IP 2102 contains an intra-MPLS-TP network ID assigned to the control information. The GRE 2103 is a GRE header.

When the data encapsulated by IP is encapsulated by MPLS, the Ethernet header (C) 501 and an MPLS label are attached as illustrated in FIG. 22.

The MPLS-TP apparatus 100 that is coupled to the virtual router control server 300 receives the control information, decapsulates the control information by MPLS, and decapsulates the control information by IP. Data transmitted/received between the virtual router control server 300 and the MPLS-TP apparatus 100 is therefore as illustrated in FIG. 21.

An intra-MPLS-TP network ID can thus be assigned to the IP 4031 of the payload 403 as well.

This invention is not limited to the embodiment described above, and includes various modification examples. For instance, the embodiment given above is a detailed description that is written for easy understanding of this invention, and this invention is not necessarily limited to a mode that includes all the components described. Replacing some components of one embodiment with components of another embodiment is also an option. Components of one embodiment may be added with components of another embodiment. For some components in each embodiment, other components may be added or deleted or may substitute.

Some of or all of the components, functions, processing parts, processing measures, and the like described above may be implemented by hardware by, for example, designing those in the form of an integrated circuit. Alternatively, the components, functions, and the like described above may be implemented by software by having a processor interpret and execute programs that respectively implement the described functions. Programs, tables, files, and other types of information for implementing the described functions can be put in a memory, a recording device such as a hard disk or a solid state drive (SSD), or a recording medium such as an IC card, an SD card, or a DVD.

What is claimed is:

1. A data transport system comprising:
transport apparatus, which are used to construct a second network coupled to a first network; and
at least one computer, which is coupled to the transport apparatus in the second network,
wherein, in order to cause the second network to seem like a single virtual communication apparatus to a communication apparatus used to construct the first network, the at least one computer is configured to execute processing that corresponds to control information of the first network transmitted from the communication apparatus,
wherein the transport apparatus include a first transport apparatus, which is coupled to the communication apparatus used to construct the first network, and a logical path is built between the first transport apparatus and the at least one computer,
wherein the first transport apparatus is configured to:
have at least one port coupled to the communication apparatus;
hold management information, which associates identification information of the port coupled to the communication apparatus with logical path identification information for identifying a logical path that is used to transmit, to the at least one computer, control information received via the port;
refer to the management information to identify the logical path identification information that is associated with the port through which the control information has been received; and
assign the identified logical path identification information to the control information, and transmit the control information over the logical path that is identified by the identified logical path identification information,
wherein the at least one computer is configured to:
execute processing that corresponds to the received control information; and
assign the logical path identification information that has been assigned to the control information to response information that is a response to the control information, and transmit the response information to the second network, and
wherein the transport apparatus include a second transport apparatus, which is coupled to the at least one computer, and the second transport apparatus is configured to receive the response information and then transmit the response information over the logical path that is identified by the logical path identification information assigned to the received response information.

2. The data transport system according to claim 1,
wherein address information of the communication apparatus is assigned to the control information, and the control information is transmitted from the communication apparatus to the first transport apparatus,
wherein the management information associates the identification information of the port with intra-second network transmission identification information, which is identification information of the logical path unique in the first network, as the logical path identification information,
wherein the first transport apparatus is configured to assign, as the logical path identification information, the intra-second network transmission identification information that is associated with a port through which the control information has been received to the control information, and then transmit the control information,
wherein the at least one computer is configured to assign, as the logical path identification information, address information of the communication apparatus that is included in the received control information to the response information, and then transmit the response information to the second network, and
wherein the second transport apparatus is configured to:
hold response information management information, which associates address information of the communication apparatus with the intra-second network transmission identification information that is unique identification information of a logical path to be used in transmission of the response information that is assigned the address information of the communication apparatus;
refer to the response information management information to identify the intra-second network transmission identification information that is associated with the address information of the communication apparatus that is included in the response information received from the at least one computer; and
assign, as the logical path identification information, the identified intra-second network transmission identification information to the response information, and then transmit the response information.

3. The data transport system according to claim 2, wherein the second transport apparatus is configured to register, in the response information management information, the address information of the communication apparatus that is included in the control information received from the first transport apparatus and the intra-second network transmission identification information that is assigned to the received control information in association with each other.

4. The data transport system according to claim 1,
wherein the logical path between the first transport apparatus and the at least one computer is provided with redundancy by a plurality of logical paths,
wherein the management information includes association between identification information of the port coupled to the communication apparatus, the logical path identification information, and redundancy information, which indicates whether the logical path identified by the logical path identification information is an active path or a standby path, and
wherein the first transport apparatus is configured to:
refer to the management information to identify the logical path identification information that is associated with the port through which the control information has been received and that is associated with the redundancy information indicative of the active path; and
assign the identified logical path identification information to the control information, and transmit the control information over the logical path that is identified by the identified logical path identification information.

5. The data transport system according to claim 1,
wherein the at least one computer includes a plurality of computers,
wherein logical paths are built between the first transport apparatus and the plurality of computers,
wherein each of the plurality of computers is configured to execute processing that corresponds to a different protocol type of the control information,
wherein the management information includes association between identification information of the port coupled to the communication apparatus, a protocol type of the control information, and the logical path identification information for identifying a logical path to be used in transmission of the control information to one of the plurality of computers that executes processing corresponding to the protocol type of the control information, and
wherein the first transport apparatus is configured to:
refer to the management information to identify the logical path identification information that is associated with identification information of the port through which the control information has been received and that is associated with the protocol type of the control information; and
assign the identified logical path identification information to the control information, and transmit the control information over the logical path that is identified by the identified logical path identification information.

6. The data transport system according to claim 1,
wherein the at least one computer includes a first computer and a second computer,
wherein a first logical path is built between the first transport apparatus and the first computer, and a second logical path is built between the first transport apparatus and the second computer,
wherein the management information includes association between the identification information of the port coupled to the communication apparatus, first logical path identification information for identifying the first logical path, and second logical path identification information for identifying the second logical path,
wherein the first logical path identification information and the second logical path identification information are associated with redundancy information that indicates which computer is an active server and which computer is a standby server, and
wherein the first transport apparatus is configured to:
make a plurality of copies of the received control information;
assign, as the logical path identification information, the first logical path identification information that is associated with the port through which the control information has been received to one of the plurality of copies of the control information, and transmit the control information over the first logical path;
assign, as the logical path identification information, the second logical path identification information that is associated with the port through which the control information has been received to another of the plurality of copies of the control information, and transmit the control information over the second logical path;
refer, in a case where response information is received from one of the first computer and the second computer, to the management information to determine whether the redundancy information that is associated with the logical path identification information assigned to the received response information indicates the active server or the standby server;
discard the received response information in a case where it is determined that the redundancy information indicates the standby server; and
transmit the received response information to the communication apparatus in a case where it is determined that the redundancy information indicates the active server.

7. The data transport system according to claim 1,
wherein the second network includes a second network management apparatus for building a logical path,
wherein the second network management apparatus is configured to: receive an input of information to be registered in the management information of the first transport apparatus; and transmit to the first transport apparatus a management information registration instruction, which includes the information input to be registered in the management information, and
wherein the first transport apparatus is configured to hold, as the management information, the information included in the received management information registration instruction to be registered in the management information, in a case where the first transport apparatus receives the management information registration instruction.

8. The data transport system according to claim 1,
wherein the first network includes one of an IP MPLS network and an IP network, and
wherein the second network includes one of an MPLS-TP network and a PBB-TE network.

9. A transmission method for transmitting control information of a first network in a data transport system in which the first network is coupled to a second network, which includes a transport apparatus, wherein the transmission method comprises:
referring, by a first transport apparatus of the transport apparatus, to management information to identify logical path identification information that is associated with a port through which the control information has been received;
assigning, by the first transport apparatus of the transport apparatus, identified logical path identification information to the control information, and transmitting the control information over a logical path that is identified by the identified logical path identification information;

executing, by at least one computer, processing that corresponds to received control information;

assigning, by the at least one computer, the logical path identification information that has been assigned to the control information, response information that is a response to the control information, and transmitting the response information to the second network; and receiving, by a second transport apparatus coupled to the at least one computer, the response information and then transmitting the response information over the logical path that is identified by the logical path identification information assigned to received response information, wherein the data transport system has at least one computer, which is coupled to the transport apparatus in the second network, wherein the at least one computer is configured to execute, in order to cause the second network to seem like a single virtual communication apparatus to a communication apparatus used to construct the first network, processing that corresponds to control information of the first network transmitted from the communication apparatus, and wherein the transport apparatus includes the first transport apparatus, which is coupled to the communication apparatus used to construct the first network, and the logical path built between the first transport apparatus and the at least one computer, wherein the first transport apparatus is configured to:
 have at least one port coupled to the communication apparatus; and
 hold the management information, which associates identification information of the port coupled to the communication apparatus with the logical path identification information for identifying the logical path that is used to transmit the control information received via the port to the at least one computer.

10. The transmission method according to claim 9, wherein the transmission method further comprises:
 assigning, by the first transport apparatus, in a case where the first transport apparatus receives the control information, as the logical path identification information, intra-second network transmission identification information that is associated with the port through which the control information has been received, and then transmitting the control information to which the logical path identification information has been assigned;
 assigning, by the at least one computer, as the logical path identification information, address information of the communication apparatus that is included in the received control information to the response information, and then transmitting the response information;
 referring, by the second transport apparatus, to a response information management information to identify the intra-second network transmission identification information that is associated with the address information of the communication apparatus that is included in the received response information; and
 assigning, by the second transport apparatus, as the logical path identification information, the intra-second network transmission identification information, which has been identified, to the response information, and then transmitting the response information, wherein the address information of the communication apparatus is assigned to the control information, and the control information is transmitted from the communication apparatus to the first transport apparatus, wherein the management information associates port identification information with the intra-second network transmission identification information, which is the identification information of the logical path unique throughout the first network, as the logical path identification information, wherein the second transport apparatus is configured to hold the response information management information, which associates the address information of the communication apparatus with the intra-second network transmission identification information that is unique identification information of the logical path to be used in transmission of the response information that is assigned the address information of the communication apparatus.

11. The transmission method according to claim 10, further comprising registering, by the second transport apparatus, in the response information management information, the address information of the communication apparatus that is included in the control information received from the first transport apparatus and the intra-second network transmission identification information that is assigned to the received control information in association with each other.

12. The transmission method according to claim 9, wherein the transmission method further comprises:
 referring, by the first transport apparatus, to the management information to identify the logical path identification information that is associated with the port through which the control information has been received and that is associated with redundancy information indicative of an active path; and
 assigning, by the first transport apparatus, the identified logical path identification information to the control information, and transmitting the control information over the logical path that is identified by the identified logical path identification information,
 wherein the logical path between the first transport apparatus and the at least one computer is provided with redundancy by a plurality of logical paths,
 wherein the management information includes association between identification information of the port coupled to the communication apparatus, the logical path identification information, and the redundancy information, which indicates whether the logical path identified by the logical path identification information is the active path or a standby path.

13. The transmission method according to claim 9, wherein the transmission method further comprises:
 referring, by the first transport apparatus, to the management information to identify the logical path identification information that is associated with the identification information of the port through which the control information has been received and that is associated with a protocol type of the control information; and
 assigning, by the first transport apparatus, the identified logical path identification information to the control information, and transmitting the control information over the logical path that is identified by the identified logical path identification information, wherein the at least one computer includes a plurality of computers, wherein a plurality of logical paths are built between the first transport apparatus and the plurality of computers, wherein each of the plurality of computers executes processing that corresponds to a different protocol type of the control information, wherein the management information includes association between the identification information of the port coupled to the communication apparatus, the protocol type of the control information, and the logical path identification information for identifying the logical path to be used in transmission of the control information to one of the plurality of computers that executes processing corresponding to the protocol type of the control information.

14. The transmission method according to claim 9, wherein the transmission method further comprises:

making, by the first transport apparatus, a plurality of copies of the received control information;

assigning, by the first transport apparatus, as the logical path identification information, a first logical path identification information that is associated with the port through which the control information has been received to one of the plurality of copies of the control information, and transmitting the control information over a first logical path;

assigning, by the first transport apparatus, as the logical path identification information, a second logical path identification information that is associated with the port through which the control information has been received to another of the plurality of copies of the control information, and transmitting the control information over a second logical path;

referring, by the first transport apparatus, in a case where response information is received from one of a first computer and a second computer, to the management information to determine whether redundancy information provided by a plurality of logical paths is associated with the logical path identification information assigned to received response information indicates an active server or a standby server;

discarding, by the first transport apparatus, the received response information in a case where it is determined that the redundancy information indicates the standby server; and transmitting, by the first transport apparatus, the received response information to the communication apparatus in a case where it is determined that the redundancy information indicates the active server, wherein the at least one computer includes the first computer and the second computer, wherein the first logical path is built between the first transport apparatus and the first computer, and the second logical path is built between the first transport apparatus and the second computer, wherein the management information includes association between the identification information of the port coupled to the communication apparatus, the first logical path identification information for identifying the first logical path, and the second logical path identification information for identifying the second logical path, wherein the first logical path identification information and the second logical path identification information are associated with the redundancy information that indicates which computer is the active server and which computer is the standby server.

* * * * *